United States Patent
Henry et al.

(10) Patent No.: US 11,544,043 B2
(45) Date of Patent: Jan. 3, 2023

(54) DYNAMICALLY GENERATED INTERFACE TRANSITIONS

(71) Applicant: Google LLC, Mountain View, CA (US)

(72) Inventors: Eric Charles Henry, Mountain View, CA (US); Sharon Harris, Mountain View, CA (US); Jonas Alon Naimark, Mountain View, CA (US); Ke Li, Mountain View, CA (US); Ariel Benjamin Sachter-Zeltzer, Mountain View, CA (US)

(73) Assignee: Google LLC, Mountain View, CA (US)

( * ) Notice: Subject to any disclaimer, the term of this patent is extended or adjusted under 35 U.S.C. 154(b) by 855 days.

(21) Appl. No.: 16/475,325

(22) PCT Filed: Aug. 21, 2018

(86) PCT No.: PCT/US2018/047337
§ 371 (c)(1),
(2) Date: Jul. 1, 2019

(87) PCT Pub. No.: WO2020/040749
PCT Pub. Date: Feb. 27, 2020

(65) Prior Publication Data
US 2022/0214865 A1  Jul. 7, 2022

(51) Int. Cl.
*G06F 8/38*  (2018.01)
*H04L 67/04*  (2022.01)
(Continued)

(52) U.S. Cl.
CPC ............... *G06F 8/38* (2013.01); *G06F 3/048* (2013.01); *H04L 67/04* (2013.01); *G06T 13/80* (2013.01)

(58) Field of Classification Search
CPC ..................................................... G06F 3/048
See application file for complete search history.

(56) References Cited

U.S. PATENT DOCUMENTS 6,720,979 B1  4/2004  Shrader
2008/0253735 A1  10/2008  Kuspa et al.
(Continued)

FOREIGN PATENT DOCUMENTS

WO  WO 2016195178     12/2016
WO  WO 2019036366      2/2019
WO  WO-2020040749 A1 * 2/2020  ........... G06F 3/0488

OTHER PUBLICATIONS material.io [online], "Choreography—Material Design," available on or before Aug. 20, 2018, via Internet Archive: Wayback Machine URL <https://web.archive.org/web/20180820044136/https://material.io/design/motion/choreography.html>, retrieved on Mar. 29, 2019, URL <https://material.io/design/motion/choreography.html>, 17 pages.
(Continued)

*Primary Examiner* — Asher D Kells
(74) *Attorney, Agent, or Firm* — Fish & Richardson P.C.

(57) ABSTRACT

Techniques are described for determining a duration for a transition and alteration of the appearance of a user interface (UI) from a first UI state to a second UI state over the transition duration according to a timing function that specifies different rates of change in appearance over the course of the transition and is derived by adjusting a master timing function that is used to control a plurality of transitions in the UI to span the transition duration for the transition. A time value of an inflection point within the timing function is determined and the transition duration is divided into a first portion and a second portion so that the first portion extends from the beginning of the transition duration to the time value of the inflection point, and the second portion extends from the time value of the inflection point to the end of the transition duration.

20 Claims, 12 Drawing Sheets

(51) Int. Cl.
*G06F 3/048* (2013.01)
*G06T 13/80* (2011.01)

(56) References Cited

U.S. PATENT DOCUMENTS

| | | | |
|---|---|---|---|
| 2009/0315897 A1* | 12/2009 | Kwiatkowski | G06T 13/00 345/473 |
| 2010/0281367 A1 | 11/2010 | Langmacher | |
| 2011/0096076 A1* | 4/2011 | Kwiatkowski | G06T 13/00 345/473 |
| 2014/0043340 A1 | 2/2014 | Sobhy et al. | |
| 2016/0070440 A1* | 3/2016 | Williams | G06F 3/0482 715/745 |
| 2017/0308275 A1 | 10/2017 | Sowden et al. | |
| 2019/0057534 A1* | 2/2019 | Henry | G06F 9/451 |

OTHER PUBLICATIONS

PCT International Search Report and Written Opinion in Appln. No. PCT/US2018/047337, dated Apr. 5, 2019, 16 pages.

support.google.com [online],"About easings—Google Web Designer Help," available on or before Sep. 7, 2015, via Internet Archive: Wayback Machine URL <https://web.archive.org/web/20150907230902/http://support.google.com/webdesigner/answer/3227667?hl=en>, retrieved on Mar. 29, 201, URL <http://support.google.com/webdesigner/answer/32276677?hl=en>, 2 pages.

PCT International Preliminary Report on Patentability in International Application No. PCT/US2018/047337, dated Mar. 4, 2021, 8 pages.

EP Office Action in European Appln. No. 18782549.2, dated Apr. 13, 2021, 5 pages.

EP Office Action in European Application No. 18782549, dated Jun. 16, 2020, 6 pages.

* cited by examiner

DYNAMICALLY GENERATED INTERFACE TRANSITIONS

CROSS-REFERENCE TO RELATED APPLICATION

This application is a National Stage Application under 35 U.S.C. § 371 and claims the benefit of International Application No. PCT/US2018/047337, filed Aug. 21, 2018. The disclosure of the foregoing application is hereby incorporated by reference in its entirety.

BACKGROUND

Given the ubiquity of various types of computing devices used for work, leisure, commerce, and social interaction, many people spend much of their time looking at a user interface presented on one computing device or other. Accordingly, designers and developers of application interfaces strive to provide interfaces that are easy to use, intuitive, visually pleasing, and/or otherwise provide a positive user experience. In some instances, to maintain user focus and prevent disorientation, operating systems and/or applications provide animated transitions between static states of the interface. To be perceived as continuous and easily comprehensible to the user, such transitions may coordinate the sequencing of the movement, appearance, and/or disappearance of elements that are presented in the interface. Such sequencing may also be referred to as choreography. Generally, each transition may be individually designed (i.e., choreographed) and specified by the application developer and/or operating system.

SUMMARY

The present disclosure is generally directed to performing transitions in a user interface (UI). More specifically, some implementations are directed to dynamically generating and performing a transition between states in a UI, based on a timing function that indicates how various elements are progressively altered in their appearance during the transition.

Often, UIs are most effective when they provide a sense of continuity to the user, even as the appearance of the UI changes. In many UIs, the particular changes in the configuration of elements are not predictable in advance. For example, an application developer or operating system designer cannot predict all the combinations of applications that a user may run concurrently, or the many different permutations of UI elements that can ultimately be arranged on the UI, and running the application may therefore result in the need to make a UI transition that is not provided for in the application, potentially leading to an error. Furthermore, the need for an application to specify many different permutations of UI element transitions can cause a significant increase in the size of the application, thus requiring greater storage space and potentially making the application slower to run. Aspects of the present disclosure provide methods of performing transitions in a user interface (UI) in an application that allows the application to be more efficiently coded, so reducing the size of the application, while allowing the application to handle all possible UI transitions. Notwithstanding the many possibilities in how UIs can be configured and changed over time, the continuity of the UI and ability of the UI to convey changes to the user can be enhanced by managing the timing of transitions in a consistent manner, as discussed below.

In some implementations, the characteristics for UI transitions are dynamically generated by the operating system or other software. A computing system can acquire information about the current arrangement of elements of the UI, as well as the desired arrangement of elements to be achieved through a transition. By assessing the similarities and differences between the two UI states, the computing system can dynamically set the properties for the transition. With this approach, the system may enhance the continuity over the course of the transition and retain the flexibility to carry out transitions between a wide range of UI configurations. In addition, applications are not required to specify characteristics for transitions. This approach can be particularly useful when the computing system transitions among views of different combinations of UI elements from different third parties, such as view that include elements from several different applications.

To achieve consistency over many different types of transitions, a master timing function can be used to derive the timing and pattern of changes in appearance of the UI. Using this master timing function, transitions can be tailored for transitions (either of the entire UI or of one or more elements in the UI) of different durations, e.g., 1 second or 5 seconds, and still share consistent pattern of change. For example, the master timing function can specify the relative rates of motion that UI elements should travel on the UI at different portions of the transition. The timing patterns specified by the master timing function can be scaled, e.g., compressed or stretched to fit short or long transitions, providing a consistent pattern of change over different types of transitions. In addition, the same master timing function can be used to determine the transitions for different types of changes, e.g., changes within the interface of a single application, changes in arrangement of windows or other elements of different applications shown together on the UI, and so on.

One innovative aspect of the subject matter described in this specification is embodied in methods that include the actions of determining, by a computing device, a transition duration for a transition of a user interface (UI) from a first UI state to a second UI state. The actions further include altering, by the computing device, the appearance of the UI to transition from the first UI state to the second UI state over the transition duration according to a timing function that (i) specifies different rates of change in appearance over the course of the transition and (ii) is derived by adjusting a master timing function to span the transition duration for the transition from the first UI state to the second UI state, the master timing function used to control a plurality of transitions in the UI. The appearance of the UI is altered by determining a time value of an inflection point within the timing function, dividing the transition duration into a first portion and a second portion so that (i) the first portion extends from the beginning of the transition duration to the time value of the inflection point, and (ii) the second portion extends from the time value of the inflection point to the end of the transition duration, progressively transforming at least one element of a set of graphical elements that is presented in the first UI state during the first portion of the transition duration, and/or progressively transforming at least one element of a set of graphical elements that is presented in the second UI state during the second portion of the transition duration.

Other embodiments of this and other aspects include corresponding systems, apparatus, and computer programs, configured to perform the actions of the methods, encoded on computer storage devices. A system of one or more computers or other processing devices can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features.

Some embodiments include generating an individual transition duration within the transition duration, and the individual transition duration is offset from the beginning of the transition duration by a specified amount of time.

In some embodiments, at least one parameter of an appearance of the at least one outgoing element and the at least one incoming element can be altered, during the transition, the at least one parameter comprising one or more of a position, a size, a shape, a Z-level, an orientation, an opacity, a color, or a shading of the respective graphical element.

In some embodiments, the parameter of the appearance of the at least one outgoing/incoming element can be altered with a varying rate of change specified by the timing function.

In some embodiments, altering the parameter of the appearance of the outgoing element can include changing the parameter from an initial value to a final value at a velocity rate that varies, over the transition duration, according to the timing function.

In some embodiments, changing the parameter from an the initial value to a final value can include moving the parameter past the final value.

In some embodiments, changing the parameter from the initial value to the final value can further include varying the value of the parameter in an oscillating manner about the final value according to a sinusoidal function having specified amplitude and attenuation.

Another innovative aspect of the subject matter described in this specification is embodied in methods that include the actions of: receiving an indication to perform a transition of a user interface (UI) from a first UI state to a second UI state; identifying (i) at least one outgoing element of the graphical elements that is presented in the first UI state and not presented in the second UI state, and (ii) at least one incoming element of the graphical elements that is presented in the second UI state and not presented in the first UI state; determining a transition duration for the transition from the first UI state to the second UI state; altering the appearance of the UI to transition from the first UI state to the second UI state over the transition duration according to a timing function that specifies different rates of change in appearance over the course of the transition, wherein the appearance of the UI is altered by: gradually removing the at least one outgoing element from the UI during a first portion of the transition duration, wherein the appearance of the at least one outgoing element is altered with a varying rate of change specified by the timing function; and gradually adding the at least one incoming element to the UI during a second portion of the transition duration, wherein the appearance of the at least one incoming element is altered with a varying rate of change specified by the timing function.

Another innovative aspect of the subject matter described in this specification is embodied in methods performed by a computing device, that include the actions of: determining, by the computing device, a transition duration for a transition of a user interface (UI) from a first UI state to a second UI state; altering, by the computing device, the appearance of the UI to transition from the first UI state to the second UI state over the transition duration according to a timing function that (i) specifies different rates of change in appearance over the course of the transition and (ii) is derived by adjusting a master timing function to span the transition duration for the transition from the first UI state to the second UI state, the master timing function used to control a plurality of transitions in the UI, wherein the appearance of the UI is altered by: defining a first portion and a second portion of the transition duration so that (i) the first portion extends from the beginning of the transition duration to the time value of a first point, and (ii) the second portion extends from the time value of a second point to the end of the transition duration; progressively transforming at least one element of a set of graphical elements that is presented in the first UI state during the first portion of the transition duration; and/or progressively transforming at least one element of a set of graphical elements that is presented in the second UI state during the second portion of the transition duration. The time value of the first point may be equal to the time value of the second point, so that the first portion of the transition duration is adjacent to, but does not overlap, the second portion of the transition duration; in this case, the time value of the first point may be the time value of an inflection point within the timing function. Alternatively, the time value of the first point may be greater than the time value of the second point, so that the first portion of the transition duration overlaps the second portion of the transition duration. Alternatively, the time value of the first point may be less than the time value of the second point so that the first portion of the transition duration is separated from, and does not overlap, the second portion of the transition duration.

These and other embodiments may each optionally include one or more of the following features.

Some embodiments include features for determining a master timing function used to control a plurality of transitions in the UI, and deriving the timing function for the transition by adjusting the master timing function to span the transition duration.

Some embodiments include features for determining an inflection time that is within a threshold range of a time of maximum rate of change specified by the timing function, and dividing the transition duration into the first portion and the second portion so that (i) the first portion extends from the beginning of the transition duration to the inflection time, and (ii) the second period extends from the inflection time to the end of the transition duration.

In some embodiments, the appearance of the at least one outgoing element and the at least one incoming element is altered, during the transition, in one or more of a position, a size, a shape, a Z-level, an orientation, an opacity, a color, or a shading of the respective graphical element.

In some embodiments, progressively altering the appearance of the at least one outgoing element includes progressively altering an opacity of the at least one outgoing element from fully opaque in the initial UI state to fully transparent at the inflection time.

In some embodiments, progressively altering the appearance of at least one incoming element includes progressively altering the opacity of the at least one incoming element from fully transparent at the inflection time to fully opaque in the final UI state.

In some embodiments, progressively altering the appearance of the at least one outgoing element includes progressively altering a size of the at least one outgoing element from an initial size in the initial UI state to zero size at the inflection time.

In some embodiments, progressively altering the appearance of the at least one incoming element includes progressively altering the size of the at least one incoming element from zero size at the inflection time to a final size in the final UI state.

Some embodiments include features for identifying at least one element of the graphical elements that is not progressively alterable in appearance ("snap-transitioned element"), and altering the appearance of the at least one snap-transitioned element to change from a respective initial appearance in the initial UI state to a respective final appearance in the final UI state at a particular time defined according to the timing function.

Some embodiments include features for identifying at least one shared element of the graphical elements that is presented in both the initial UI state and the final UI state, and progressively altering the appearance of the at least one shared element from a respective initial appearance in the initial UI state to a respective final appearance in the final UI state, the progressive altering of the appearance of the at least one shared element being dynamically determined, in response to the received indication, according to the timing function.

In some embodiments, progressively altering the appearance of the at least one shared element includes moving each shared element from an initial position to a final position at a velocity that varies, during the transition, according to the timing function.

In some embodiments, progressively altering the appearance of the at least one shared element includes changing a size of each shared element from an initial size to a final size with a rate of change in size that varies, during the transition, according to the timing function.

In some embodiments, progressively altering the appearance of the at least one shared element includes rotating each shared element from an initial orientation to a final orientation with a rate of rotation that varies, during the transition, according to the timing function.

In some embodiments, progressively altering the appearance of the at least one shared element includes changing a color of each shared element from an initial color to a final color with a rate of change in color that varies, during the transition, according to the timing function.

Some embodiments include features for accessing data for a master timing function that defines a curve that is monotonically increasing, deriving the timing function for the transition by scaling the curve to extend over the entire the transition duration.

In some embodiments, gradually removing the at least one outgoing element comprises altering the appearance of the at least one outgoing element with a timing pattern defined by a first portion of the scaled curve.

In some embodiments, gradually removing the at least one outgoing element comprises altering the appearance of the at least one outgoing element with a timing pattern defined by a second portion of the scaled curve.

During a transition between two states in a UI, an animation framework, operating system, and/or other software module coordinates the sequencing and appearance (e.g., choreography) of graphical elements that are presented in the UI during at least a portion of the time period when the UI is transitioning between states. The graphical elements may present information in the form of text, shapes, symbols, colors, icons, images, video data, graphics, windows, panels, frames, and so forth. The graphical elements may also include controls that a user can interact with, such as buttons, lists, tabs, menus, data entry form fields, slider controls, clickable graphics, selectable icons, and so forth.

The graphical elements may include static elements, shared elements, incoming elements, and/or outgoing elements. Static elements include those elements that have the same appearance (e.g., position, shape, size, color, etc.) in both the initial and final states of the transitioning UI, such that their appearance may not need to be altered during the transition. Shared elements are present in both the initial and final states, and exhibit a change in appearance between the initial and final states. Such a change in appearance can include a change in one or more of a position, size, shape, orientation, Z-level, opacity, pattern, color, or some other aspect of the element's appearance. Outgoing elements are present in the initial state but not the final state. Incoming elements are present in the final state but not in the initial state. The outgoing and incoming elements can respectively transition out of, or into, the UI through a change in size, opacity, position, and/or some other visible characteristic.

Generally, computing systems do not use a standard approach for interface transition choreography, and application developers typically design each transition individually to try to achieve an aesthetically pleasing result. For example, during traditional development of an application, a developer may attempt to visualize each possible transition between UI states for the application, and then manually compose a lookup table for each possible transition. The lookup table may indicate the particular state of each element at various intermediary points in time during the transition, or may otherwise describe for each individual element that particular manner in which that element is to be animated to achieve the transition. This manual, highly customized, and labor intensive transition design process creates a complex set of dependencies for each transition, often with no underlying logic for how the values relate or how the values would need to be adjusted to accommodate various contingencies such as a change in overall transition speed, change in output display size, and so forth. The look-up table must be coded into the application, and as the size of the look-up table increases the size of the application increases, and the time required to retrieve an entry from the look-up table also increases thereby reducing the speed of the application. Also, it is possible for application in use to encounter to need to make a UI transition that is not provided for in the application.

The implementations described herein enhance the UI transition process by managing the choreography of multiple transitions through use of a single timing function applied across multiple transitions in a particular application, multiple applications, or within a broader computing environment. The common timing function relates the progress of a transition to time, such that the timing function provides, for each time during a transition, the degree of progress that each element has reached in its transition at that time.

In some implementations, an animation framework or other software module that is managing a transition receives, as input, a master timing function and a duration of the transition. The master timing function and the duration may be used to derive a timing function for the particular transition, by stretching or compressing the master timing function to span the particular duration of the transition. The master timing function may be specified by a designer (e.g., of the application). The timing function is applied (e.g., directly) to the shared elements such that the appearance of each shared element is progressively altered, according to the timing function, across the duration of the transition. The values of the various appearance characteristics (e.g., size, position, orientation, etc.) of each shared element are interpolated between the initial state and final state according to the timing function, as described further below.

An inflection time is determined based on the timing function, or is otherwise associated with the timing function. In some implementations, the inflection time is a time of peak velocity of the timing function (e.g., a point of maximum rate of change, or point of maximum value of the first derivative of the timing function), and/or within a threshold time period of the time of peak velocity. The timing function can be divided, at the inflection time, into a first subsection (prior to the inflection time) and a second subsection (after the inflection time). The first subsection, from transition start to the inflection time, is used to drive the animation of the outgoing elements, such that the outgoing elements are progressively altered according to interpolations performed according to the first subsection. The outgoing elements begin in the initial UI state with their initial appearance, and their appearance is progressively altered until the outgoing elements disappear from the UI at the inflection time. The second subsection, from inflection time to transition end, is used to drive the animation of the incoming elements, such that the incoming elements are progressively altered according to interpolations performed according to the second subsection. The incoming elements begin to appear in the UI at the inflection time and progressively change in appearance until reaching their final appearance in the final UI state. That is, the outgoing elements progressively disappear from the UI during the first subsection, and the incoming elements progressively appear in the UI during the second subsection.

Rather than using a unique, individually designed (e.g., bespoke) choreography for each transition according to traditional techniques, implementations may employ a single timing function, or a single master timing function, to manage multiple interface transitions within an application, a set of applications, or a broader computing environment. Through use of a common timing function, or master timing function, for multiple transitions, implementations allow multiple UI transitions to be controlled on the basis of a single master timing function, thereby eliminating the need to code a look-up table into the application and so reducing the size of the application and eliminating delays caused by retrieving an entry from a look-up table. Implementations also provide a cohesive set of transitions that are consistent with respect to appearance, style, perceptual continuity, ease of comprehension, and positive user experience in general. Implementations may also provide for ease of optimization for individual transitions in terms of the user perception of speed, by adjusting the duration of the transition and deriving a timing function that is the master timing function fit to the adjusted duration. This facilitates the fine-tuning of one or more transitions.

In some implementations, the timing function is also used to manage transition of those elements that are not suitable for progressive alteration during a transition, such as elements displaying different text in the initial and final states, table-view or grid elements that change a number of rows and/or columns between the initial and final states, and so forth. Such elements are described herein as snap-transitioned elements. In some implementations, a snap-transitioned element is changed from its initial state to its final state at the inflection time associated with the timing function. This change may be a cut, dissolve, or other substantially instantaneous change in the presented snap-transitioned elements from their initial state to their final state. Accordingly, the same timing function may be used to manage the transition of the progressively altered elements (e.g., shared, incoming, and/or outgoing elements) as well as the snap-transitioned elements that are not progressively altered.

In some implementations, a single master timing function is employed to manage multiple UI transitions, with the master timing function being adjusted to suit the span of each of the individual UI transitions. In some implementations, multiple master timing functions may be used, with each timing function applied to manage different classes or types of transitions, or with the transforming of different elements in a single UI transition being controlled using respective different master timing functions. For example, one timing function may produce changes in speed that are relatively inconspicuous to the user, and may be used to handle transitions of a more functional nature. Another timing function may produce somewhat more abrupt speed changes, and may be used for emphasis at significant moments. Implementations automatically adapt the choreography of all the transitioning elements to the timing function that is applied for a particular transition.

Implementations provide one or more of the following technical advantages. By employing a timing function to dynamically determine the way in which elements are to be altered during a UI transition from an initial state to a final state, implementations avoid the need for individual transitions to be manually designed and coded during development of an application. Accordingly, implementations provide for a more efficient development process that is simpler, less time-consuming, and less prone to the introduction of bugs. Moreover, by applying a single timing function to multiple transitions, implementations avoid the need for each transition to be manually specified in a lookup table or otherwise hard-coded and predetermined. Accordingly, implementations provide for a smaller-sized executable for an application, in the form of a smaller binary, machine-code executable, executable script, or intermediate language file, than would be the case if the executable was required to include hard-coded and/or individually specified choreographies for each possible transition. Thus, implementations reduce the amount of storage space and/or network bandwidth that is needed to respectively store and/or communicate the executable.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
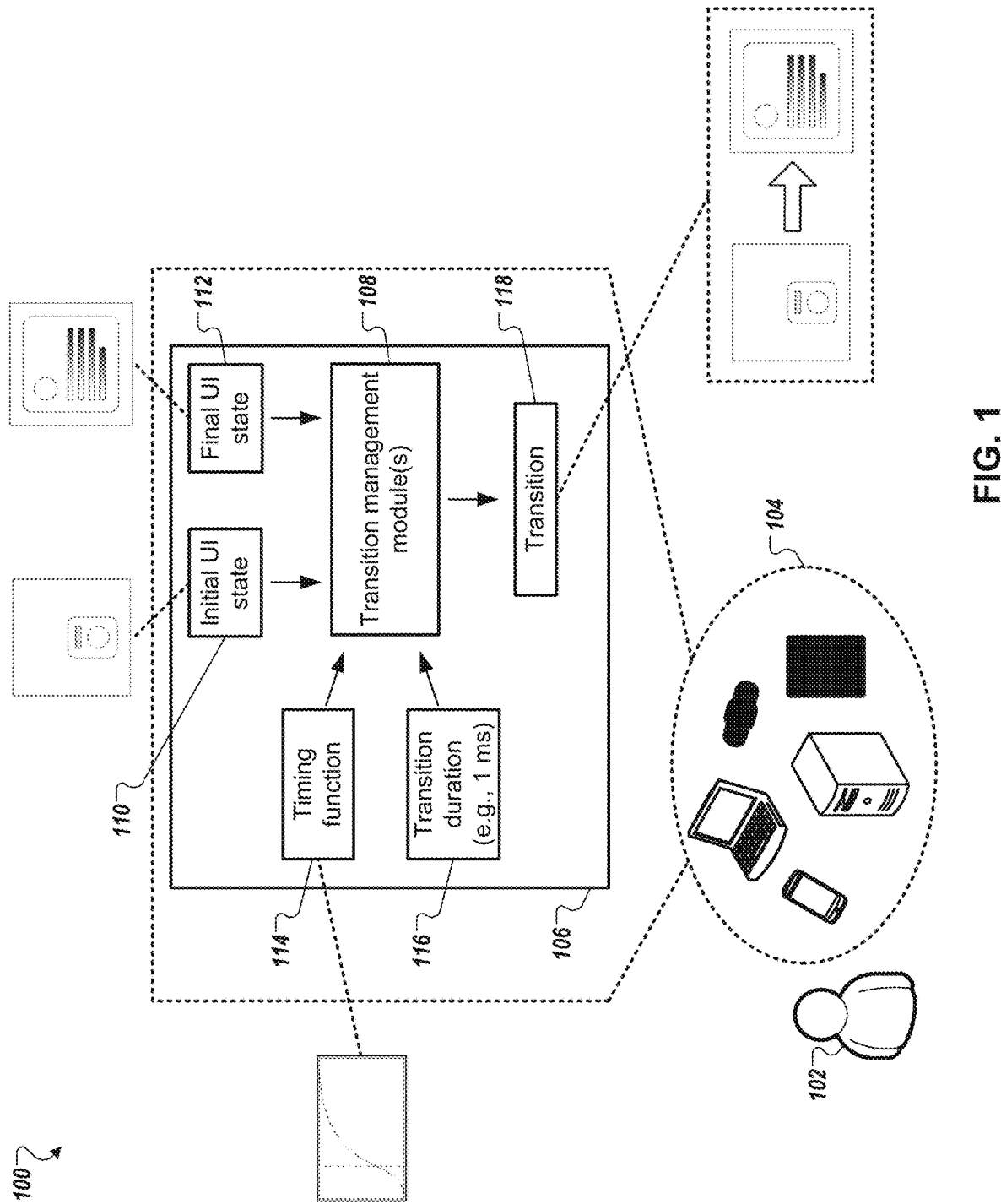
FIG. 1 depicts an example system for dynamic generation and execution of interface transitions, according to implementations described herein.

FIG. 1 depicts an example system 100 for dynamic generation and execution of interface transitions, according to implementations described herein. As shown in the example of FIG. 1, a user 102 may operate a user device 104. The user device 104 may be any suitable type of computing device, including portable (e.g., mobile) computing devices such as a smartphone, tablet computer, wearable computer, and so forth. The user device 104 may also be a less portable type of computing device, such as a laptop computer, desktop computer, smart appliance, gaming or entertainment console, and so forth. An application may execute on the user device 104 and present a UI through a display of the user device 104. In some instances, the application may execute on some other computing device and may send output to be presented through the display of the user device 104. In either scenario, a software module 106 may execute to manage a transition 114 between two UI states of the application UI. In some instances, the software module 106 may be an animation framework that is a component of an operating system (OS) and/or a component of a particular implementation of an OS. In some instances, the software module 106 may be a library, OS component, and/or OS implementation component that manages the display of information for various application UIs. Alternatively, the software module 106 may handle the display of information for a particular application, and/or may be a component of the application. The module 106 may include one or more transition management modules 108 that handle the transition 118 of a UI from an initial UI state 110 to a final UI state 112. Alternatively, the module 106 itself may handle the transition 118.

An initial UI state 110 and a final UI state 112 may be determined by the module(s) 108 and/or 106. The initial UI state 110 is the state of the UI at the start of (e.g., immediately prior to) the transition, and the final UI state 112 is the state of the UI at the end of (e.g., immediately after) the transition. A state of the UI, such as an initial state, final state, or any intermediary state, can include any suitable number of graphical elements in any suitable arrangement, with each graphical element having a particular set of characteristics in its appearance. Appearance characteristics can include, but are not limited to, one or more of the following: a position of an element within the UI, expressed in X and Y coordinates or some other coordinate system; a Z-level of the element, indicating a depth or stacking level, and/or whether the element is behind and/or on top of other elements; a size of the element, such as a length, width, and/or other dimensions; an orientation of the element relative to some suitable reference axis; an opacity of the element, indicating a degree of transparency or opacity of the element; a color of the element, described according to any suitable color palette or color model; and/or a fill pattern for the element (e.g., cross-hatched, etc.).

In some implementations, a timing function 114 and a transition duration 116 are employed to determine the particular manner in which the various elements are to be animated during the transition from initial UI state 110 to final UI state 112. The transition duration 116 is the amount of time to complete the transition, from a start time (e.g., when the UI is in its initial UI state) to an end time (e.g., when the UI is in its final UI state). As described above, a timing function is a function of time, $p=F(t)$, where p indicates the degree of progress of elements in their transition from an initial state to a final state. A timing function 114 may be depicted as a curve in two dimensions, where the X-axis is time, and the Y-axis is the degree of progress. For example, the timing function 114 may be depicted as a curve from (0,0) to (1,1), that shows the progress of the transition with the passage of time. In this example, the point (0,0) represents the beginning of the transition, or the first UI state, and the point (1,1) represents the end of the transition when the second UI state is reached at time $t=1$. The timing function 114 may also be described as an easing function. In a particular example, the timing function 114 is a cubic Bézier curve. Any of various curves or functions can be used to specify the pattern and rate that transitions occur.

In some implementations, the timing function 114 provides a transition that appears more natural, gentle, or aesthetically pleasing to a viewing user. For example, instead of a strictly linear function that would cause the elements to mechanically progress from one state to another, at a fixed velocity, with a sudden start and sudden end, the timing function 114 may indicate that the progress of the elements is to start gradually at the beginning of the transition, accelerate somewhat until some time in the middle of the transition, then begin to decelerate until the elements ease into their final states at the end of the transition. Accordingly, a timing function may exhibit at least one inflection point at some time during the transition, when the elements stop accelerating and begin decelerating. An example of the timing function 114 is described further below, with reference to FIG. 3.

In some implementations, a master timing function is employed to derive one or more particular timing functions 114 that are used to manage one or more different transitions. A master timing function is a timing function that may be unspecified in its duration, or that may have a particular (e.g., default) duration. The particular timing function 114 can be derived from the master timing function by expanding or compressing the master timing function, as appropriate, to span the particular duration that is to be used for a particular transition. In this way, implementations may employ a master timing function to provide a similarly appearing progression for multiple transitions but with potentially different durations for the transitions.

The module(s) 108 and/or 106 may employ the timing function 114 to determine how to progressively alter the appearance of each graphical element during the transition. For the shared elements, the entirety of the timing function may be employed to determine the rate of progress in change of appearance for each shared element from the initial UI state to the final UI state. For example, if a shared element is moving from one position (x1, y1) to another position (x2, y2) in the transition, the timing function may be used to interpolate the position of the element at various times during the transition as it moves from its first position to its second position. As a particular example, if the timing function indicates that the element has made p progress (e.g., on a scale from 0 to 1) at time t during the transition, the interpolation may indicate that the x-position of the element at time t is x1+(x2−x1)×p, and the y-position of the element at time t is y1+(y2−y1)×p. As another example, if a shared element is changing in size from having a dimension d1 in the initial UI state to having a dimension d2 in the final UI state, the interpolation may indicate that the dimension (e.g., length, width, radius, etc.) of the element at time t is |d1−d2|×p, if the timing function p=F(t) indicates that a degree of progress p has been achieved at time t.

Interpolation of visual characteristics of elements may be determined in a similar fashion for other types of visual characteristics. For example, if an element is to change its orientation during a transition, the element may be progressively rotated, at a rate that is determined based on the timing function, from its initial orientation to its final orientation. As another example, if an element is to change its opacity during a transition, the element may be progressively rendered as more or less opaque with the passage of time, according to the timing function. As another example, if an element is to change its color during a transition, the progress of the element from its initial color (e.g., RGB) value to its final color value may be determined according to the rate of change indicated by the timing function. In some instances, multiple appearance characteristics of an element may be simultaneously altered during a transition, and each appearance characteristic may be progressively changed through an interpolation that is based on the same timing function.

In some implementations, a particular time within the duration of the transition may be designated as an inflection time. In some implementations, the inflection time is a time of peak velocity (e.g., maximum first derivative) of the timing function, or within a threshold time period of the time of peak velocity. The timing function may be divided into a first subsection and a second subsection based on the inflection time. The first subsection may be the portion of the timing function from the start time of the transition until the inflection time, and the second subsection may be the portion of the timing function from the inflection time to the end time of the transition. The first subsection may be used to control the transition of outgoing elements, using a similar interpolation to that described above. The inflection point can divide the overall transition duration into two portions or periods, which are also referred to as subsections.

For example, at the start of the transition, the outgoing elements are present in the UI with their initial appearance in the initial UI state, and are progressively altered in appearance according to interpolation based on the first subsection, until the outgoing elements disappear from the UI at the inflection time. Similarly, the second subsection may be used to control the transition of incoming elements.

At the inflection time, the incoming elements begin to appear within the UI, and are progressively altered in appearance according to interpolation based on the second subsection, until the incoming elements reach their final appearance in the final UI state. Thus, in some implementations, neither incoming elements nor outgoing elements may be presented in the UI at the inflection time. In this manner, the overall transition between two UI states can be divided into two distinct portions or periods, where the changes to the outgoing elements are made during the first portion, and the changes to the incoming elements are made during the second portion. The pattern of motion or other change follows the progress defined by the corresponding segment of the timing function. For example, the inflection point may essentially split the timing function into two curves respectively used for different aspects of the transition. The value of the timing function curve at the end of the first subsection is defined to represent 100% progress of removal of the outgoing elements and 0% progress of addition of incoming elements, regardless of the value of the timing function curve at the inflection point.

In some instances, a UI may present elements that are not suitable for progressive alteration, such as elements that present text that changes during the transition, table or grid elements that change a number of rows and/or columns during the transition, and so forth. Such elements are described as snap-transition elements. In some implementations, snap-transition elements are changed in appearance, at the inflection time, from their initial state to their final state. Static elements may retain the same appearance throughout the transition, and as such may not be subject to alteration based on the timing function.

Through use of the master timing function to drive the transition of various graphical elements in a transitioning UI, implementations avoid the need for individually designed, predetermined transition animations for the various possible transitions within an application. Implementations provide for a dynamically generated UI transition within an application, where the transition is determined during the execution of the application (e.g., at run-time) in response to receiving an indication that such a transition is required. For example, a user may be viewing the application on the user device 104, and the user may perform an action that prompts the application to transition from one state to another state. As a particular example, the user may select (e.g., click on, gesture on) a control to request that the application present a different view than is currently presented, with elements presented differently and/or different elements. In response to the user selection, the application may initiate the transition from the current view to the new view, and the particular way in which the transition is to be animated may be determined dynamically in response to the user selection and based on the timing function as described herein.

In some implementations, the first period of the transition when outgoing elements are removed may overlap with the second period when incoming elements are added. For example, rather than using a single inflection point to define the two periods, different start and stop times could be defined. For example, with a time of 1 representing the full transition duration, the first period could occur over a period of [0, 0.75], while the second period could occur over a period of [0.25, 1]. Thus, to achieve a desired visual effect, the first and second periods of the transition may partially or completely overlap.

For shared elements that move or change in appearance between two UI states, changes may occur according to one of several options. For example, the change in appearance of a shared element may occur progressively over the entire duration of the transition. As another example, changes for shared elements may occur only during the first period, along with the change in outgoing elements. As another example, changes for shared elements may occur only during the second period, along with the changes for incoming elements. As another example, the transition may be divided into three periods, such as a first period in which changes to the outgoing elements occur, a second period in which shared elements are changed, and a third period in which incoming elements are added. The periods may be non-overlapping, or may be overlapping. For any of these different approaches to changing the shared elements, the pattern of motion follows the timing of the corresponding portion of the timing function, e.g., with progress of the changes from 0% to 100% occurring as specified by the first half of the timing function if the changes occur in the first half of the overall transition duration.

Figure 2:
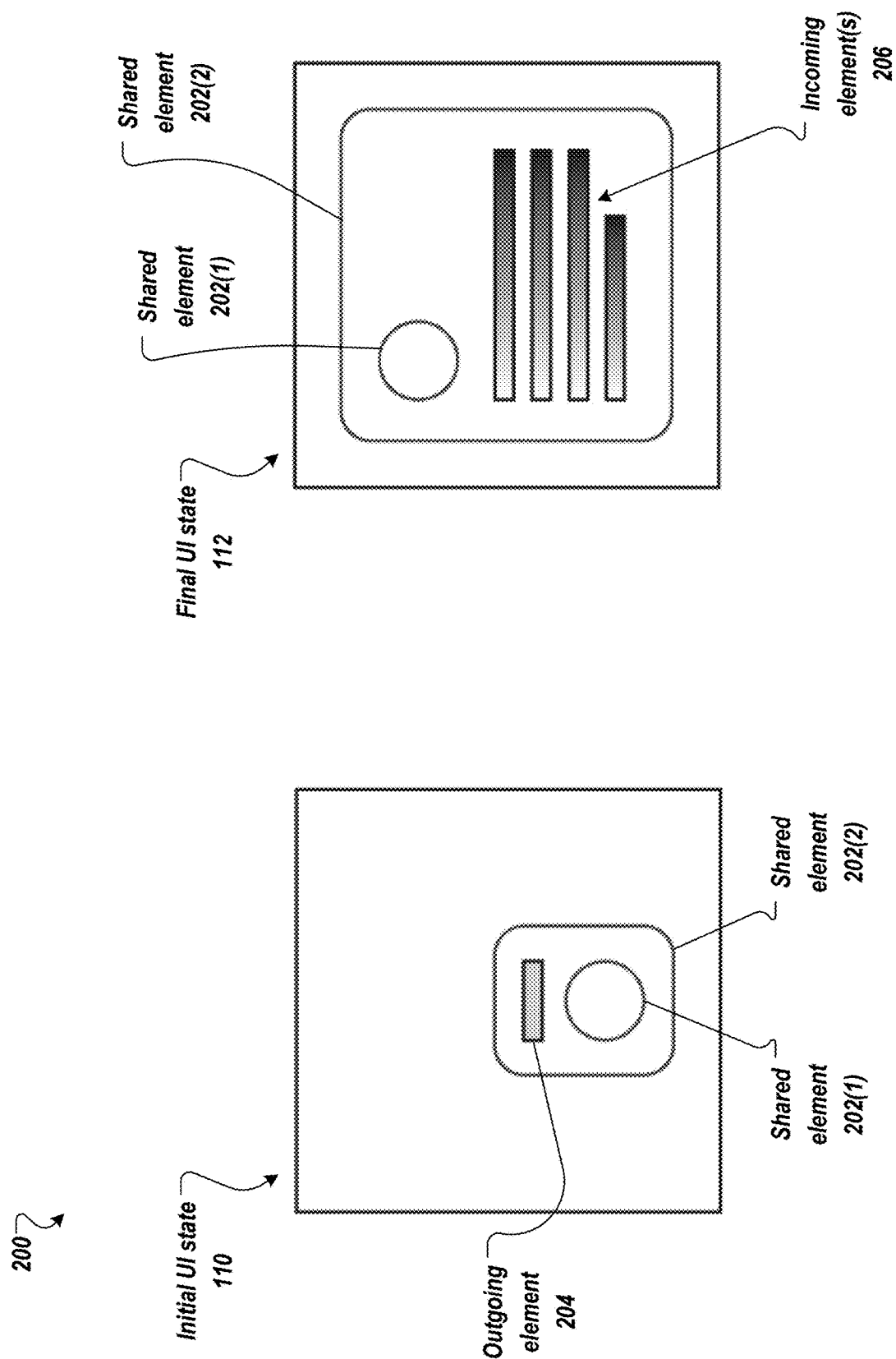
FIG. 2 depicts example initial and final states of a transitioning interface, according to implementations described herein.

FIG. 2 depicts an example 200 of a UI that is transitioning from an initial state 110 to a final state 112. In this example, the UI presents two shared elements 202(1) and 202(2), an outgoing element 204, and an incoming element 206. The shared elements 202(1) and 202(2) are present throughout the transition, but change in appearance between the initial UI state 110 and the final UI state 112. In this example, the shared element 202(1) changes its position (but not its size), and the shared element 202(2) changes its size (e.g., length and width dimensions). The outgoing element 204 is present in the initial UI state 110, and is not present in the final UI state 112. The incoming element 206 is not present in the initial UI state 110, and is present in the final UI state 112.

Figure 3:
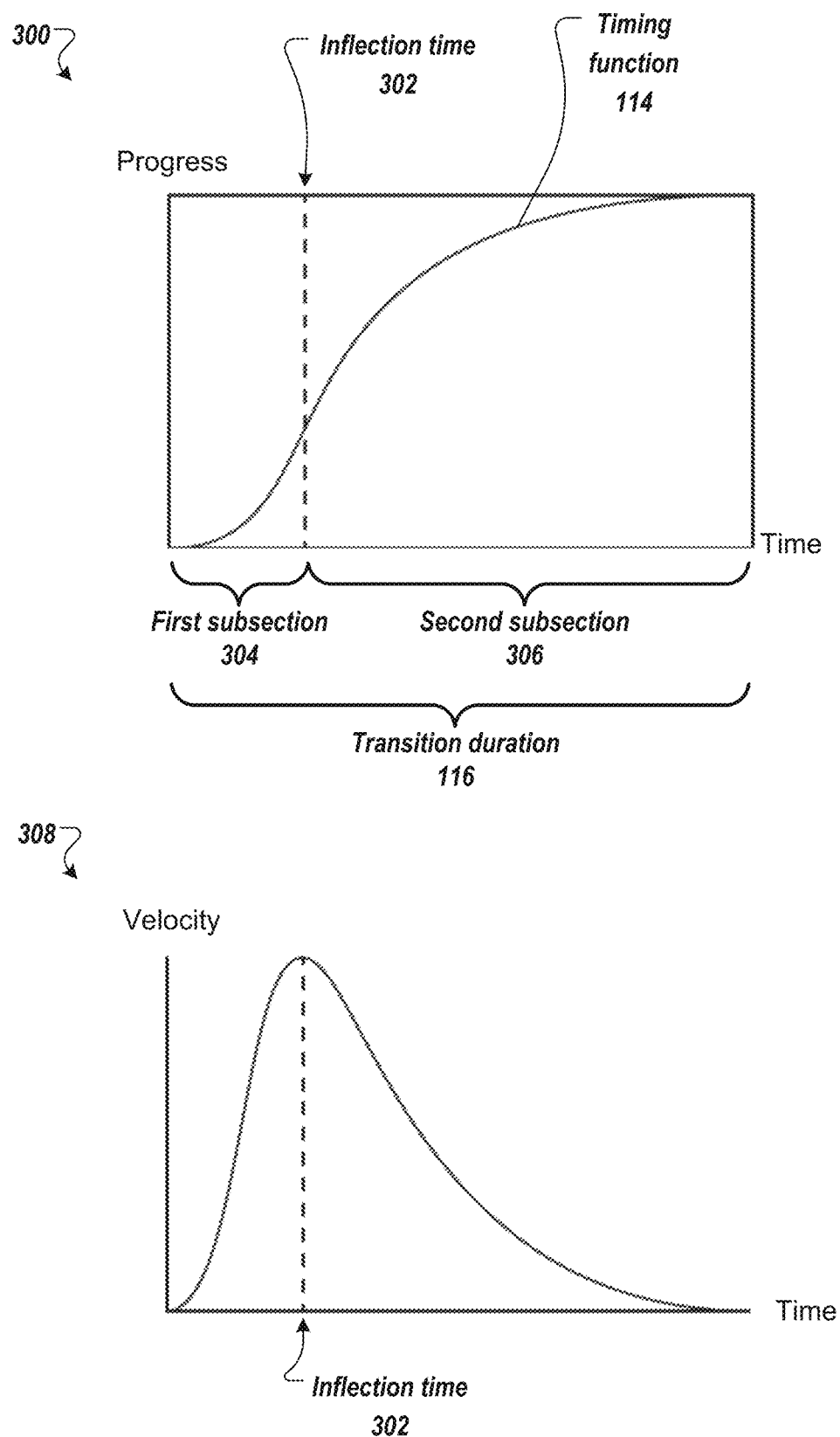
FIG. 3 depicts an example timing function for dynamically generating an interface transition, according to implementations described herein.

FIG. 3 depicts an example 300 of a timing function 114 to be used as a master timing function for dynamically generating an interface transition. As described above, the timing function 114 to be used in a transition can span the transition duration 116, from a start time to an end time. The timing function 114 may indicate, for each time during the duration, a degree of progress in the transition that has been reached at that time. An inflection time 302 is identified within the timing function 114, and is used as the particular time that terminates the transition of the outgoing elements and that begins the transition of the incoming elements. The first subsection 304 is the portion of the timing function 114 from the start time to the inflection time 302, and the second subsection 306 is the portion of the timing function 114 from the inflection time 302 to the end time. As described above, the first subsection 304 and the second subsection 306 respectively drive the progressive change of the outgoing and incoming elements. In some implementations, the timing function 114 (e.g., as an easing function) is not linear, and may include periods of acceleration and deceleration to provide a more natural feel for the UI transition. Accordingly, the timing function 114 may provide a mapping of linear time progression to a non-linear rate of progress of the transition.

FIG. 3 also shows an example 308 of the graphed first derivative (e.g., time derivative) of the timing function 114, with velocity being the rate of change in progress over time. In this example, the inflection time 302 is a time of peak velocity of the timing function 114, such as a local maximum or an overall maximum of the first derivative of the timing function 114. Alternatively, the inflection time 302 may be approximately the time of peak velocity and/or within a threshold time period of the time of peak velocity. Other suitable inflection times 302 within the time span of the timing function 114 may also be used. In some implementations, the timing function 114 is monotonic or non-decreasing over the entire span of the timing function, which can provide a sense of greater consistency to the viewer of the UI transition.

Figure 4:
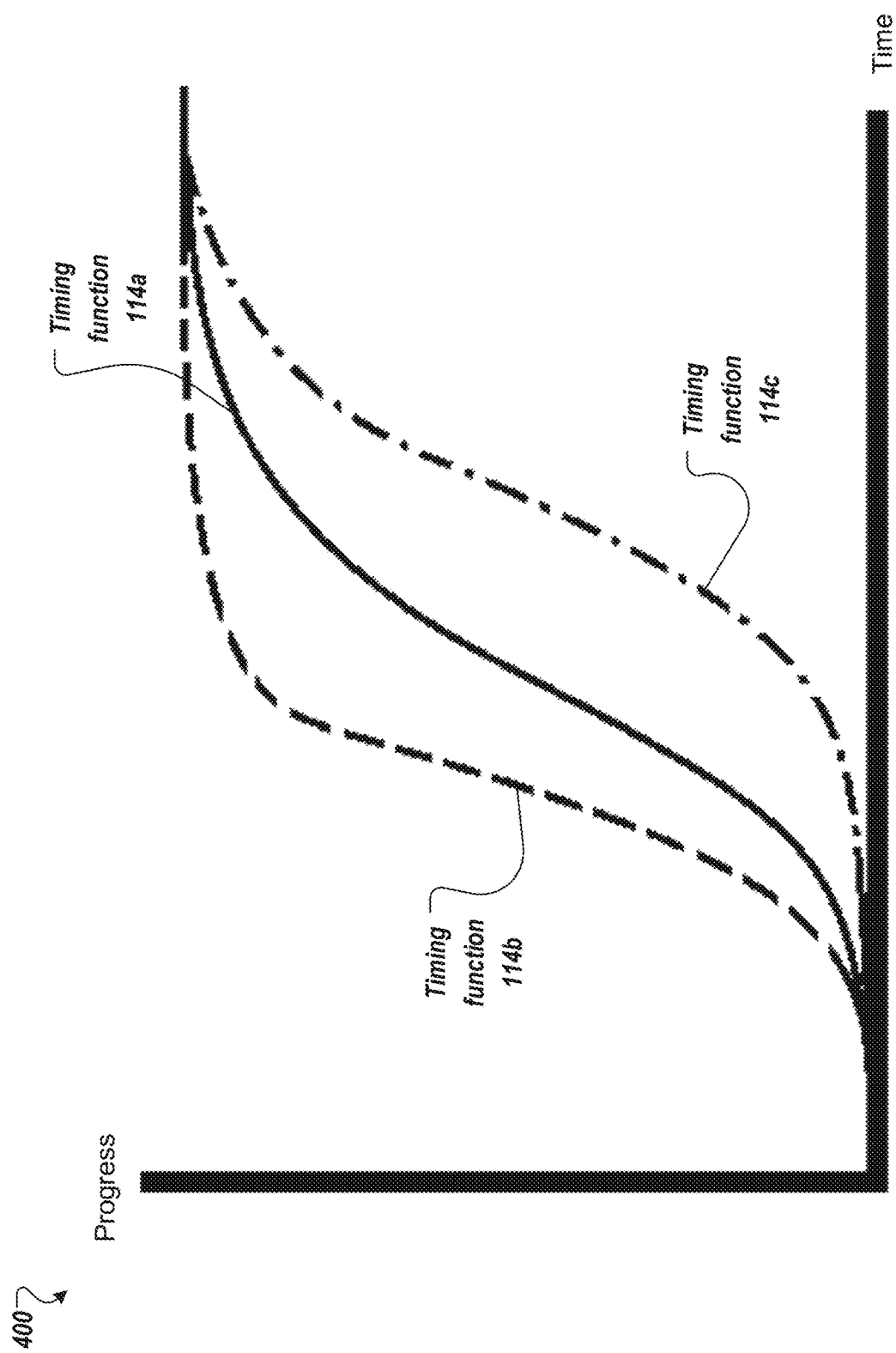
FIG. 4 depicts example timing functions for dynamically generating an interface transition, according to implementations described herein.

FIG. 4 depicts an example 400 of particular timing functions 114a, 114b, and 114c that can be applied to a UI transition. In these examples, the functions are cubic Bezier functions, which model smooth curves and create the effect of a seamless transition that is not jarring to a viewer. Changes in the timing function that governs a particular transition provide different effects by changing, for example, the speed at which the majority of the transition is performed. The speed at which a transition is performed, or the acceleration of the transition, can determine a feeling that is evoked in a user that views the transition. This transition effect is known as easing. For example, a particular cubic Bezier function, such as timing function 114a, with a particular second derivative (e.g., second time derivative) that provides, for example, standard easing, evokes a feeling different from the feeling evoked from a function, such as timing function 114b, with a larger second derivative (e.g., larger second time derivative or faster acceleration), such that the function with faster acceleration can provide more dramatic effect and further emphasize the UI transition, and can provide emphasized easing. A function, such as timing function 114c, with a smaller second derivative (e.g., smaller second time derivative or slower acceleration) can provide a more subdued effect and deemphasize the UI transition, and can provide another form of emphasized easing.

The effects of each different timing function 114a, 114b, and 114c, can provide different tones. For example, timing function 114b can provide an intense tone when compared to timing function 114a, and timing function 114c can provide a relaxed and graceful tone when compared to timing function 114a. Emphasized easing places emphasis at the end of a UI transition, and can express both relaxed and intense feelings when viewed. In some implementations, when there is a faster acceleration with respect to the timing function 114 applied to a particular UI transition, there can be a slower deceleration, thus completing the UI transition more slowly. For example, if a UI object is moving in a linear path from off-screen to the middle of the screen according to timing function 114b, the UI object would initially move with fast acceleration, and then move more slowly to the final UI state as it comes to a stop.

In addition to the timing function's first and second derivatives, the duration of a UI transition can be changed. Operations as described with respect to FIG. 4 may be performed by one or more of the software module 106, the transition management module(s) 108, or other software module(s) executing on the user device 104 or elsewhere. The duration of a UI transition is the length of time over which the transition's timing function spans, and changes to the duration of a transition can have different visual effects. In some implementations, shortening the duration of an animation can make it feel bolder and more intense or focused, while lengthening an animation's duration can express a more relaxed tone that does not draw attention to any one UI element or transition.

Different types of timing functions can have differing optimal durations. For example, a function with slow, or even standard acceleration, may produce poor visual effects or otherwise perform poorly for durations above a certain threshold, such as 400 ms. Human viewers may have a preferred duration for UI transitions, such as 300 ms, and in some implementations, adjustments to a transition duration made around the preferred duration can provide a desired effect or evoke a desired feeling from a viewer. For example, small adjustments to the duration of a transition, such as increasing the duration of a transition from 300 ms to 350 ms can express a more relaxed effect, or shortening the duration of the transition from 300 ms to 250 ms can express a more bold effect. However, large adjustments to the duration of a transition, such as slowing the transition from 300 ms to 550 ms could be too slow for an average human viewer, while speeding up the transition from 300 ms to 115 ms could be jarring. Changes to the duration of the timing function 114 applied to a particular UI transition, as well as mechanisms for effecting the changes are described in further detail below with reference to FIG. 12.

Figure 5:
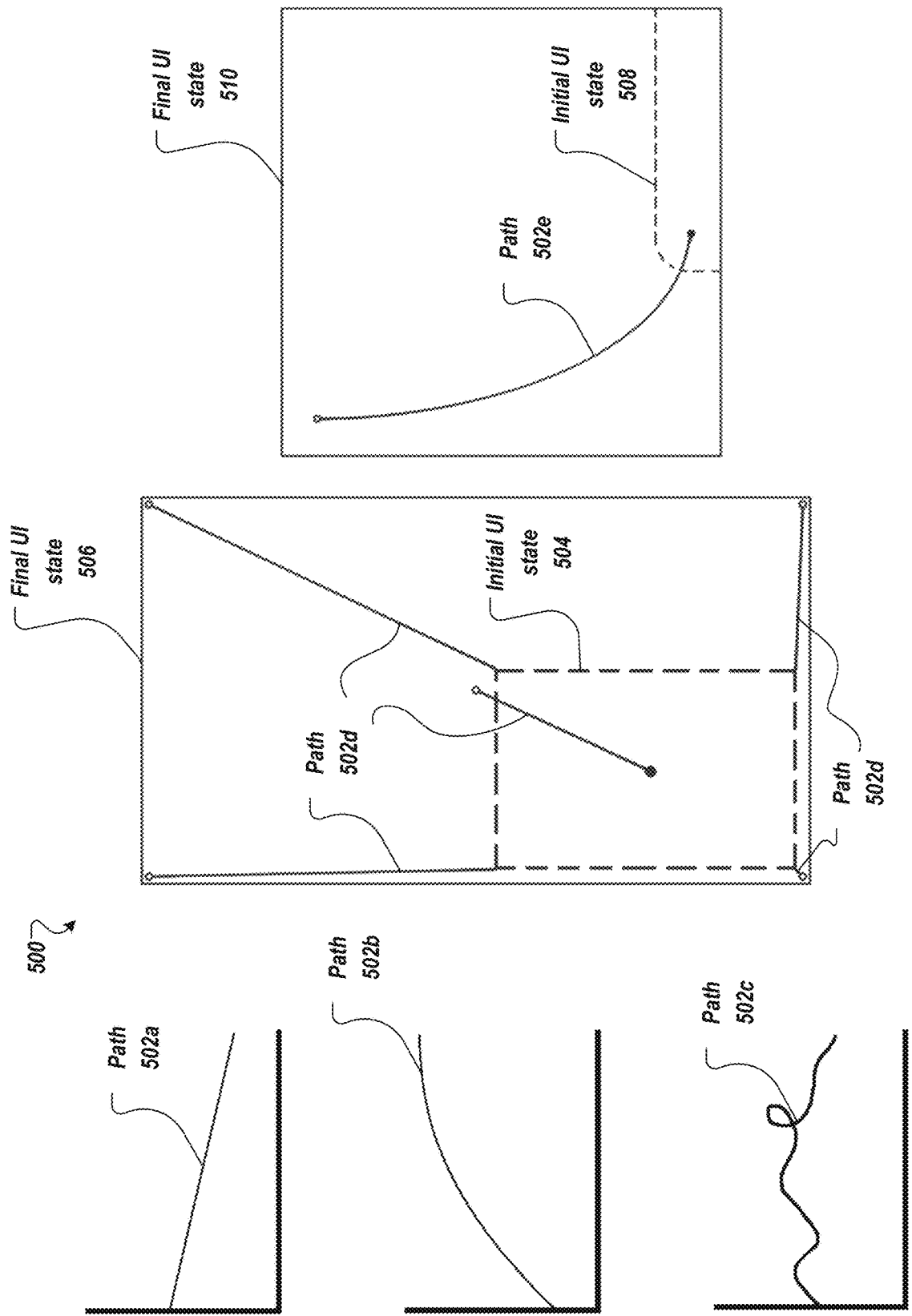
FIG. 5 depicts example paths along which a particular UI element can transform during an interface transition, according to implementations described herein.

FIG. 5 depicts an example 500 of multiple paths 502*a*, 502*b*, 502*c*, 502*d*, and 502*e*, along which a particular UI element can transform during its transition. As an element transforms, it transforms along a line called a path which defines the value of a parameter of the UI element as a function of time (where the parameter of the UI element may for example be a position of the element, a size of the element, a shape of the element, a Z-level of the element, an orientation of the element, an opacity of the element, a color of the element, a shading of the element, etc.). In some implementations, paths can be linear by default, and if an element changes size or moves diagonally, the path can be linear or along an arc. In these particular examples, the UI element can change position within the viewable portion of the screen (e.g., change xyz coordinates) along any type of path. The UI element begins in its initial UI state at the beginning of the path and follows the path to its final UI state. In addition to changing position, UI elements can change appearance, for example, by expanding or collapsing to its final UI state. Various other visual transitions can be performed, such as transitioning from one shape to a different shape, transitioning from within the viewable portion of the screen to outside of the viewable portion of the screen, fading into or out of view by increasing or decreasing the transparency of a UI element respectively, etc., but for ease of illustration, FIG. 5 depicts exemplary paths for coordinate changes and expansion and compression. It will however be understood that the description is generally applicable for any parameter of the UI element.

Path 502*a* is a linear path, path 502*b* is a path defined by a function, and path 502*c* is a user-defined path that does not follow a particular function. Each of paths 502, 502*b*, and 502*c* are paths along which a particular UI element can travel throughout its transition from its initial UI state to its final UI state. The UI element can begin at point 502*a*(1), 502*b*(1), and/or 502*c*(1) at its initial UI state and can travel along points defined by path 502*a*, path 502*b*, and/or path 502*c* at a speed governed by a particular timing function 114 until it reaches point 502*a*(2), 502*b*(2), and/or 502*c*(2) at its final UI state at the end of the timing function 114 duration.

Path 502*d* is a linear path along which a particular UI element can expand throughout its transition from its initial UI state 504 to its final UI state 506. In this example, the UI element, such as a text box or a card, can transform between collapsed (e.g., initial UI state 504) and expanded (e.g., final UI state 506) states in a straightforward way. Linear motion produces a simple movement suited for most transitions, and is minimally distracting. Points within the UI element are moved to different coordinates and are expanded in size as they are transformed from state 504 to state 506. The motion of points within the UI element is defined by path 502*d*, and the transformation of the features within the UI element is governed by a function of the path 502*d* and the timing function 114 applied to the particular UI transition. For example, the expansion of the features within the UI element can be automatically generated by applying the path 502*d* and the timing function 114 to a vectorized form of the UI element such that the UI element can be transformed at various points along the path 502*d* relative to its initial UI state 506.

Path 502*e* is an arced path along which a particular UI element can expand throughout its transition from its initial UI state 508 to its final UI state 510. In this example, the UI element, such as a text box or a card, can transform between collapsed (e.g., initial UI state 508) and expanded (e.g., final UI state 510) states in natural way. Arcs mimic natural movement, and are suited to transitions that require a large adjustment to the aspect ratio of a surface, such as a particular UI object or element. Points within the UI element are moved to different coordinates and are expanded in size as they are transformed from state 508 to state 510. The motion of points within the UI element is defined by path 502*e*, and the transformation of the features within the UI element is governed by a function of the path 502*e* and the timing function 114 applied to the particular UI transition. For example, the expansion of the features within the UI element can be automatically generated by applying the path 502*e* and the timing function 114 to a vectorized form of the UI element such that the UI element can be transformed at various points along the path 502*e* relative to its initial UI state 508.

An arc path has two possible orientations, referred to as vertical out and horizontal out. Vertical out means UI elements following that arc will finish with a vertical motion, while horizontal out means UI elements following that arc finish with a horizontal motion. In some implementations, a particular orientation is more suited to a particular UI transition, and the optimal arc path orientation can be determined by considering the motion of an expanding surface. The arc should match the primary scrolling axis of the UI. For example, a card element in a vertically scrolling UI would optimally be expanded using a vertical out arc, first moving horizontally and then vertically. In some implementations, opposite transitions of a UI element are performed along the same path, in the reverse direction. Following this example, when the card collapses, the motion reverses, and the UI element first moves vertically and then horizontally.

Figure 6:
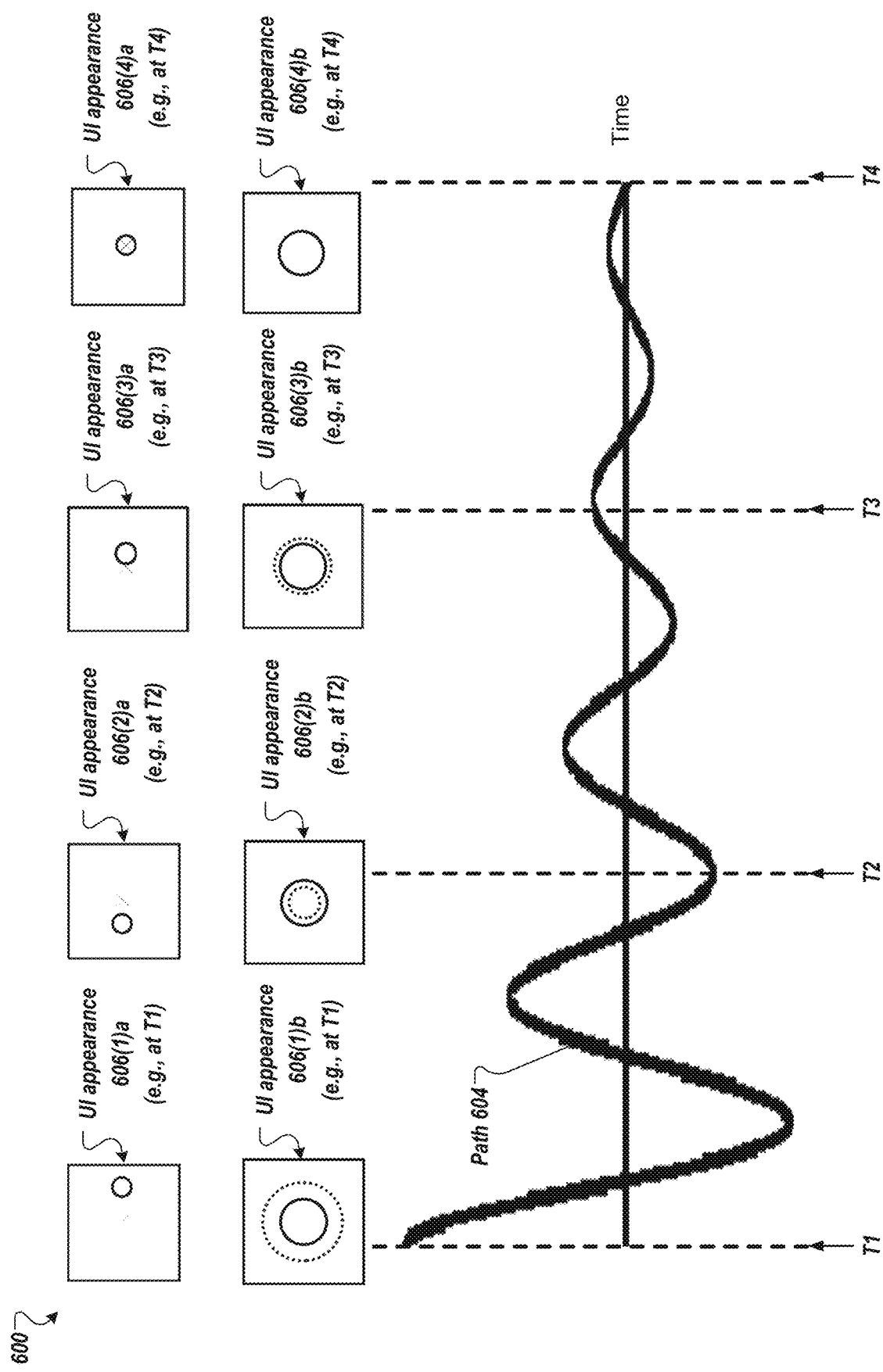
FIG. 6 depicts an example interface transition that is performed based on an example timing function, according to implementations described herein.

FIG. 6 depicts an example 600 of a particular type of transition effect, known as overshoot. Overshoot refers to animating an element past its resting position, as though propelled by a great force. Oscillation, a type of overshoot, is a type of movement effect in which a UI transition uses more than one overshoot effect. Each additional back and forth movement is smaller than the previous one. Overshoot is again described with reference to coordinate changes and expansion and compression for ease of explanation, but it will again be understood that the description is generally applicable for any parameter of the UI element. Overshoot is implemented when a UI element (e.g., UI element 602*a* or UI element 602*b*) moves along a path that follows a sinusoidal function starting with an initial UI state of UI element 602 and centered about a final UI state of UI element 602*a* or UI element 602*b*. At particular points along its transition function, UI element 602*a* or UI element 602*b* overshoots its final UI state, thus providing a unique and interesting visual effect of oscillating about the final UI state. This visual effect provides advantages including increased brand awareness and can associate fun and memorable visual effects with a particular web page or document. Overshoot can emphasize important or time-sensitive information. Overshoot can also communicate playfulness and energy to small UI elements, such as switches or buttons, and lends quirky character to elements animated with this particular transition effect. However, oscillation may not be appropriate to apply to applications requiring functional and efficient interactions. In this example, the oscillation case of overshoot is illustrated. Oscillation can be used to apply a particularly recognizable style, such as the UI is transitioned from an initial UI state to a final UI state, and follows a path 604. At a start time T1 of the transition, the UI is in its initial UI state with appearance 606(1)a corresponding to UI element 602a or appearance 606(1)b corresponding to UI element 602b. At a subsequent time T2, the UI has begun its transition and exhibits an appearance 606(2)a corresponding to UI element 602a or appearance 606(2)b corresponding to UI element 602b, as UI element 602a and/or UI element 602b has moved from its initial UI state toward and past its final UI state as governed by timing function 114d, and has overshot the final UI state. In this example, with respect to UI element 602a, the overshoot has occurred with respect to a final x coordinate position within the UI, marked as "x" in the figure. In this example, with respect to UI element 602b, the overshoot has occurred with respect to growing smaller than a final size for UI element 602b (the dotted circle denotes the instantaneous size of the UI element 602b, and the full circle denotes the final size). At a subsequent time T3, the UI exhibits an appearance 606(3)a corresponding to UI element 602a or appearance 606(3)b corresponding to UI element 602b, as UI element 602a and/or UI element 602b has moved from its state at T2 toward and past its final UI state as governed by timing function 114d, and has overshot the final UI state in the other direction. In this example, with respect to UI element 602a, the overshoot has occurred in the opposite direction than UI element 602a's position at T2 with respect to the final x coordinate position within the UI. In this example, with respect to UI element 602b, the overshoot has occurred with respect to shrinking smaller than the final size for UI element 602b. In this particular example, timing function 114d is a damped sinusoidal function, and thus UI element 402a reaches its final UI state with appearance 606(4)a and UI element 402b reaches its UI final state with appearance 606(4)b at the end time T4.

In some implementations, path 604 is underdamped, and the particular UI element or elements that follow path 604 may not come to rest at a final UI state at the end of an associated timing function duration. For example, if path 604 is underdamped, a UI element following path 604 may not come to rest at a final position for the UI element by the end of the duration of an associated timing function. Underdamped oscillating functions have a settling time, or a time period between the application of a force (e.g., the beginning of the path) and when the function remains within a given range of a final position. If the settling time of the underdamped oscillating function path is longer than the duration of the transition's timing function, then the UI element following path 604 may not come to rest at a final position by the end of the duration.

In some implementations, path 604 is overdamped, such that the particular UI element or elements that follow path 604 come to rest prior to the predetermined final position or positions. For example, if path 604 is overdamped, a UI element following path 604 does not oscillate, and instead simply transitions directly to a resting state that does not reach the final UI state.

In some implementations, path 604 is critically damped, such that the particular UI element or elements that follow path 604 does not perform a complete oscillation (one complete cycle of a forward and backward motion, from one extreme—maximum or minimum—to another and back), and instead asymptotically approaches the final UI state. A single overshoot effect is achieved with a critically damped path such that the final UI state is overshot once and then the path settles to the final UI state.

In some implementations, if one or more UI elements does not naturally come to a rest at a predefined final position by the end of the duration of an associated timing function, operations may be performed to bring the one or more UI elements to a rest. For example, the duration of the timing function can be shortened or extended such that the timing function ends when the UI elements are at the predetermined final positions. If the UI elements are not synchronized with respect to their positions relative to their predetermined final positions, each UI element's transition can be individually controlled such that a particular UI element stops movement at its predetermined final position.

Operations can be performed to change various aspects of a path, including the intensity of the function (e.g., amplitude, damping ratio), types of functions (including compression or torsion spring functions, spring attachment points, etc.), and modifiers to existing functions, including amplifier and attenuator coefficients. Such changes affect the path, including the speed and amplitude with which the UI element approaches its final UI state. These operations may be performed by one or more of the software module 106, the transition management module(s) 108, or other software module(s) executing on the user device 104 or elsewhere.

Figure 7:
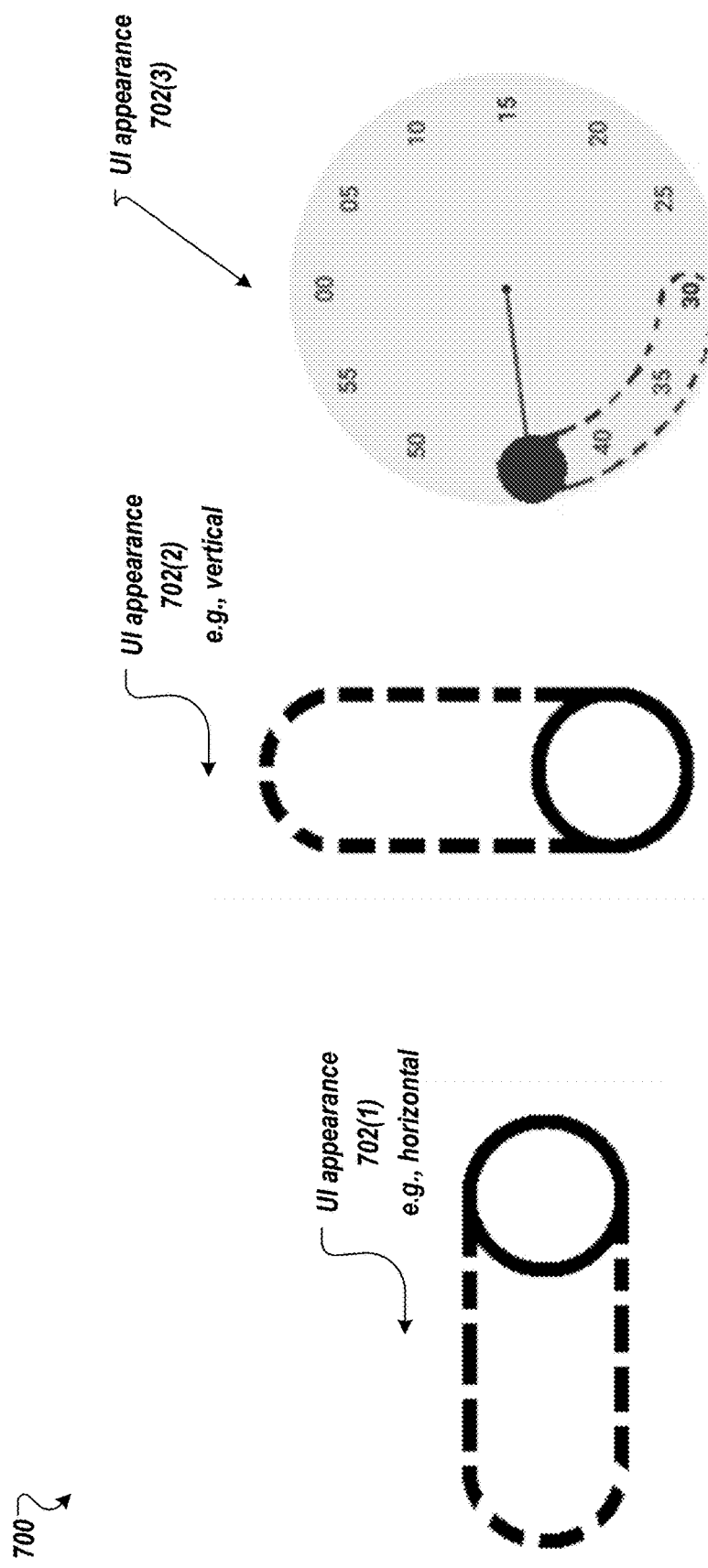
FIG. 7 depicts another example interface transition that is performed based on an example timing function, according to implementations described herein.

FIG. 7 depicts an example 700 of a transition effect known as stretch. Stretch refers to increasing a UI element's size along a single axis. Simple UI elements, such as switches and sliders, can suggest high speed effects by stretching in the direction they are moving. Stretch is an interesting visual effect that draws user attention to a particular element and emphasizes its motion and evokes a sense of speed. For example, stretch can be used to create a "trail" that stretches behind a moving UI element as an effect that emphasizes the path between the initial UI state and the final UI state. Stretch can add character to various indicators, including a stepper selection indicator, or hands on a clock face. However, stretch effects can be distracting for complex shapes/anything other than horizontal or vertical, etc. In this particular example, UI appearance 702(1) shows horizontal stretch, where the solid line indicates the UI element 704 itself, and the dotted lines indicate the stretch trail. UI appearance 702(2) shows vertical stretch, where the solid line indicates the UI element 706 itself, and the dotted lines indicate the stretch trail. UI appearance 702(3) shows stretch along a circular path, for example, a hand moving along the face of a clock, where the solid line indicates the UI element 708 itself, and the dotted lines indicate the stretch trail.

Stretch effects can be implemented by increasing the size of an element along a direction of motion, by including a temporal offset for how long the element lasts (such the element as it is drawn at any particular position does not exit from the UI until after a certain period of time, thus creating a visual trail of previously-rendered versions of the UI element behind it). Additionally, stretch effects can be customized by changing various parameters of the stretch by, for example, turning on or off the stretch effect in a particular direction or controlling how long the trailing edge delay is.

Figure 8:
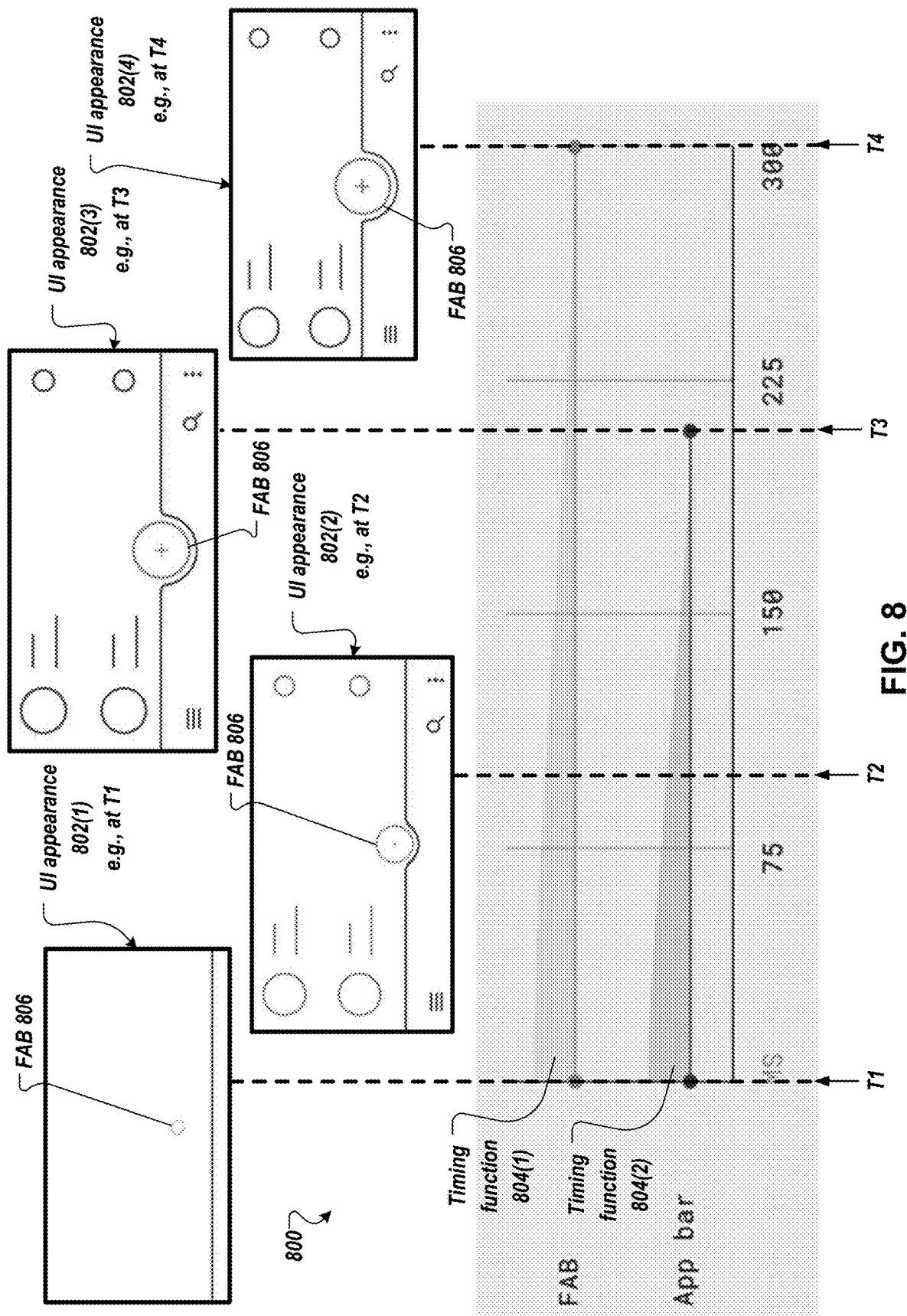
FIG. 8 depicts an example interface transition effect that is performed based on an example timing function, according to implementations described herein.

Elevation refers to an elements' location on the z-axis. During a transition, elevation can be animated to increase depth and emphasize layering. Elevation effects include parallax and scale. Parallax refers to an effect that occurs when elements close to the view move faster than those farther away. Parallax can be used to indicate that elements occupy different elevations and emphasize depth, particularly in applications like scrolling through a page. Scale effects, such as elements that shrink in size appear to recede into the background, and elements that grow larger appear to raise in elevation. Elevation effects can be achieved using synchronous movement such that one element grows while another shrinks FIG. 8 depicts an example 800 of a temporal effect on a UI transition. Temporal offset is an effect that emphasizes the offset element in multiple element transitions. In this particular example, a floating action button (FAB) can stand out by finishing its entrance after all other animations have stopped. At a start time T1 of the transition, the UI has begun its transition and exhibits an appearance 802(1) in which the multiple UI elements have begun their transition to the final UI state as governed by timing functions 804(1) and 804(2). The timing functions 804(1) and 804(2) may be derived from the same master timing function, for example by adjusting the duration of the master timing function to match the duration T1 to T4 to obtain the timing function 804(1) and adjusting the duration of the master timing function to match the duration T1 to T3 to obtain the timing function 804(2). The transition of all of the application bar elements, with the exception of the FAB, are governed by timing function 804(2), whereas the FAB's transition is governed by timing function 804(1). At a subsequent time T2, the UI continues its transition and exhibits an appearance 802(2), in which all of the application bar elements except for the FAB 806 have completed half of their transition. At a subsequent time T3, all of the application bar elements but FAB 806 have completed their UI transition and reached their final UI state and the UI exhibits an appearance 802(3). At a subsequent time T4, FAB 806 has also completed its UI transition and reached its final UI state and the UI exhibits an appearance 802(4). In this particular example, FAB 806 has a transition timing function with a duration that is 100 ms longer than the timing function applied to each of the other functions.

The lasting transition of FAB 806 emphasizes its entrance, and draws a user's focus to FAB 806 over the other elements of the application bar. Various parameters of the temporal offset effect can be changed, including the duration of the offset, whether the offset occurs in the beginning of the transition, to which UI elements the offset applies, etc. Such changes affect which UI elements are emphasized, and how they are emphasized. These operations may be performed by one or more of the software module 106, the transition management module(s) 108, or other software module(s) executing on the user device 104 or elsewhere.

Figure 9:
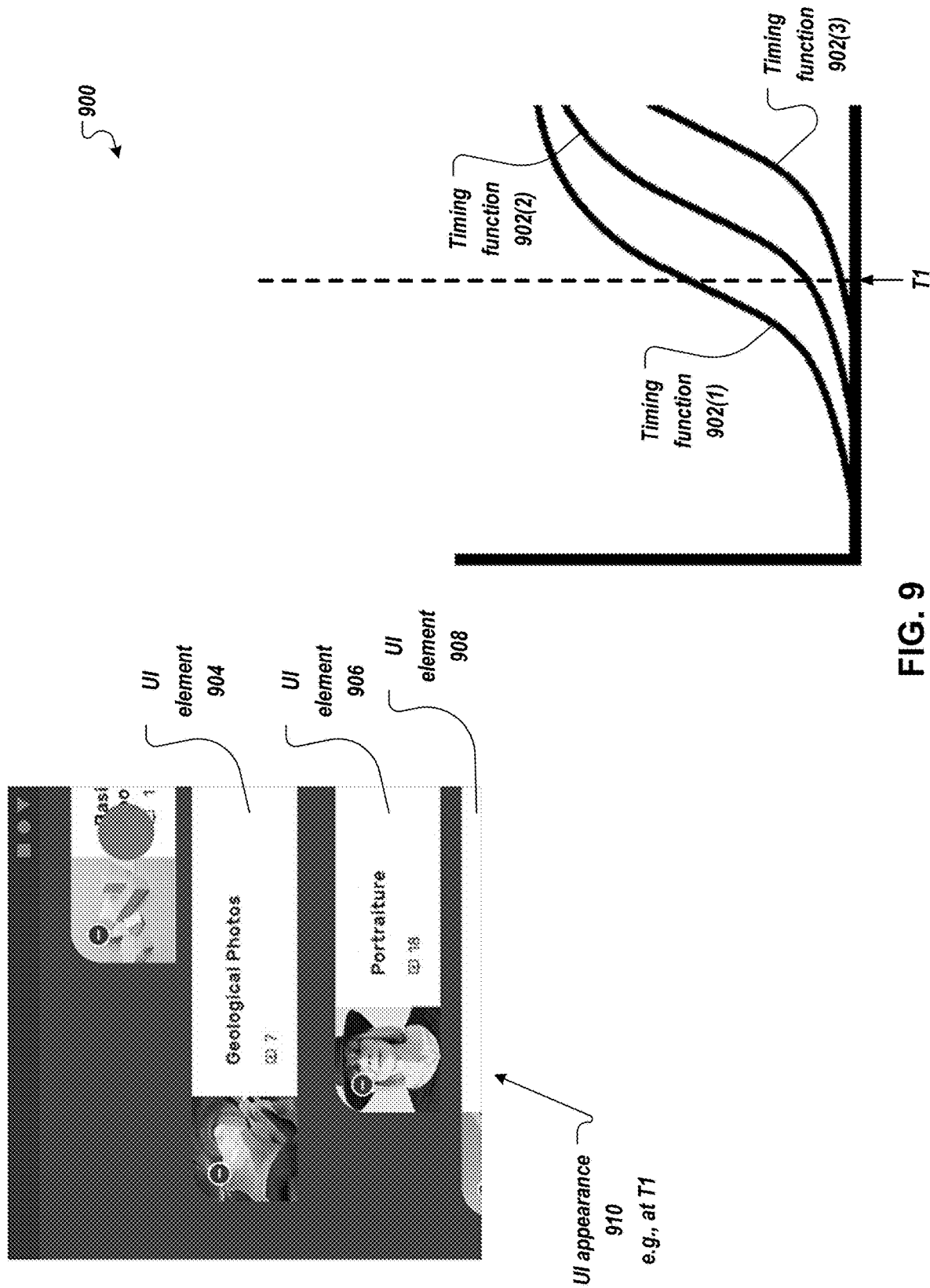
FIG. 9 depicts another example interface transition effect that is performed based on an example timing function, according to implementations described herein.

FIG. 9 depicts an example 900 of another temporal effect on a UI transition. Stagger refers to applying temporal offsets to a group of UI elements in sequence, like a list. Stagger creates a cascade effect that focuses attention briefly on each item in turn, and can add polish to important transitions. For example, a transition can be embellished with a stagger when a user returns to an application UI. Stagger can also reveal significant content or highlight affordances within a group. For example, stagger can hint that each member of a group of UI elements can act as a separate affordance, and encourage interaction with individual UI elements. In this example, the UI shown in the example of FIG. 9 is transitioned from an initial UI state to a final UI state, and the transition is performed according to exemplary timing function 902(1) for UI element 904, timing function 902(2) for UI element 906, and timing function 902(3) for UI element 908. Again, the timing functions 902(1), 902(2), 902(3) may be derived from the same master timing function. For example, timing function 902(1), 902(2), and 903(3) can be derived by adding different constant time delay variables to the same master timing function. Timing functions for different UI elements can be derived from a single master timing function for the entire UI transition in various ways, such as applying a multiplier, adding or subtracting a constant, raising a variable to a particular power (positive or negative), etc. At a time T1 of the transition, the UI has begun its transition and exhibits an appearance 910 in which the multiple UI elements have begun their transition to the final UI state as governed by their respective timing functions.

Similarly to the temporal offset effect, various parameters of the stagger effect can be changed, including the duration of the offset, to which UI elements the offset applies, etc. Such changes affect which UI elements are emphasized, and how they are emphasized. These operations may be performed by one or more of the software module 106, the transition management module(s) 108, or other software module(s) executing on the user device 104 or elsewhere.

Figure 10:
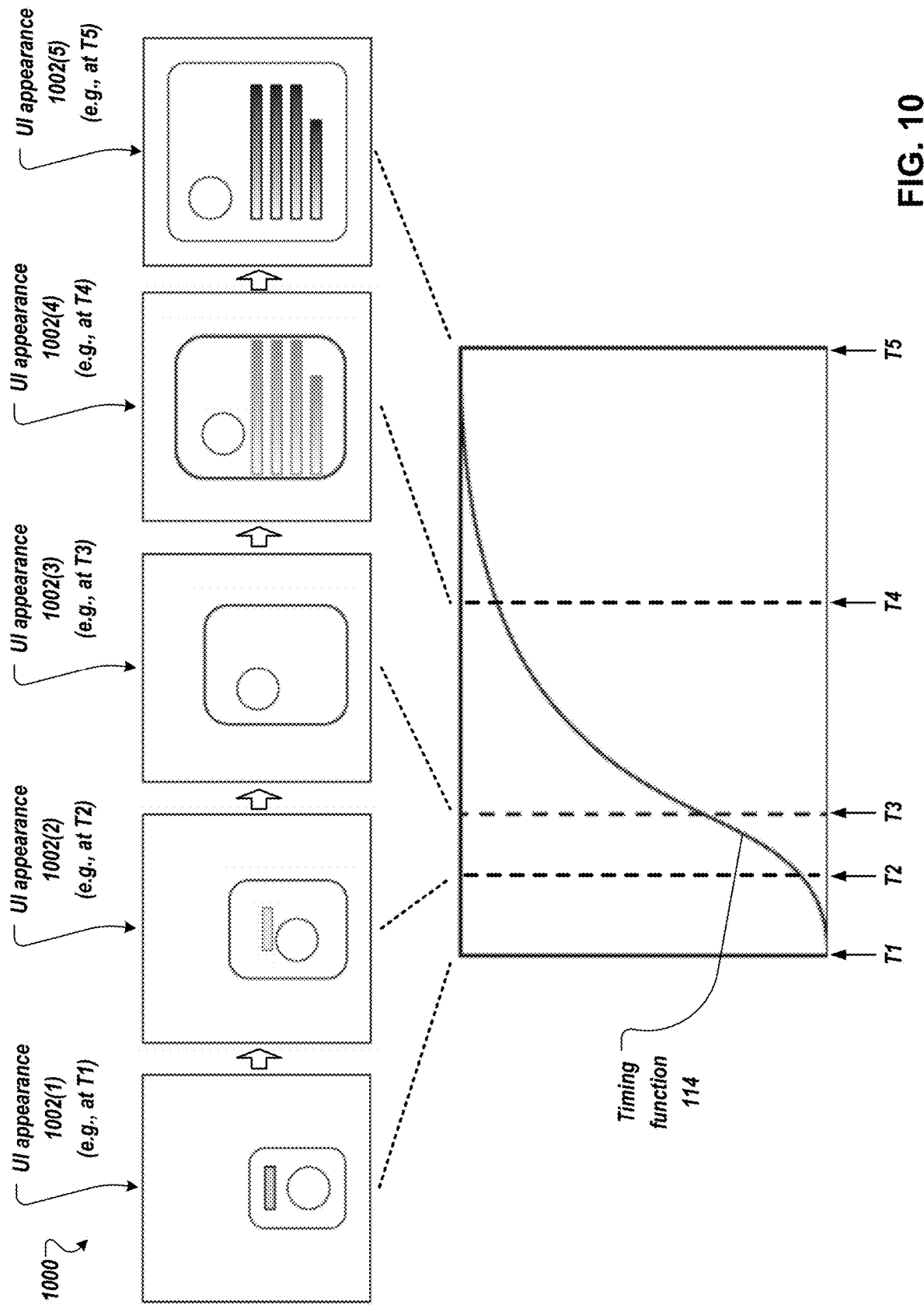
FIG. 10 depicts an example interface transition that is performed based on an example timing function, according to implementations described herein.

FIG. 10 depicts an example 1000 of a UI transition. In this example, the UI shown in the example of FIG. 2 is transitioned from an initial UI state to a final UI state, and the transition is performed according to the example timing function 114 shown in FIG. 3. At a start time T1 of the transition, the UI is in its initial UI state with UI appearance 1002(1). At a subsequent time T2, the UI has begun its transition and exhibits an appearance 1002(2), in which one shared element (e.g., the circle) has begun moving toward its final position, a second shared element (e.g., the bounding box) has started to grow in size toward its final size, and an outgoing element (e.g., the single rectangle) has started becoming more transparent to fade from the UI. At a subsequent time T3 (e.g., the inflection time), the UI exhibits an appearance 1002(3) in which the outgoing element has disappeared, and the shared elements have progressed in their respective transitions. At a subsequent time T4, the UI exhibits an appearance 1002(4) in which the shared elements are farther along in their respective transitions, and an incoming element (e.g., the multi-rectangle element) has begun to come into view. At the end time T5, the UI exhibits an appearance 1002(5) in its final UI state, with the shared elements and the incoming element in their final state.

Implementations support the use of various appearance changes that cause incoming elements to gradually appear in the UI, and that cause outgoing elements to gradually disappear from the UI. In some instances, elements may come into the UI or go out of the UI through a change in opacity, such that incoming elements begin as fully transparent and gradually become more opaque, and such that outgoing elements begin as fully opaque and gradually become more transparent. In some instances, elements may come into the UI or go out of the UI through a change in size, such that incoming elements begin with zero dimension and gradually grow to their final size, and such that outgoing elements begin as full-sized and gradually shrink to zero dimension. In some instances, elements may come into the UI or go out of the UI through a change in position, such that incoming elements begin at a position outside the display (e.g., off-screen) and gradually move into their final position, and such that outgoing elements begin at their initial position in the display and gradually move out of view. Other techniques may also be used to bring in incoming elements or remove outgoing elements.

Figure 11:
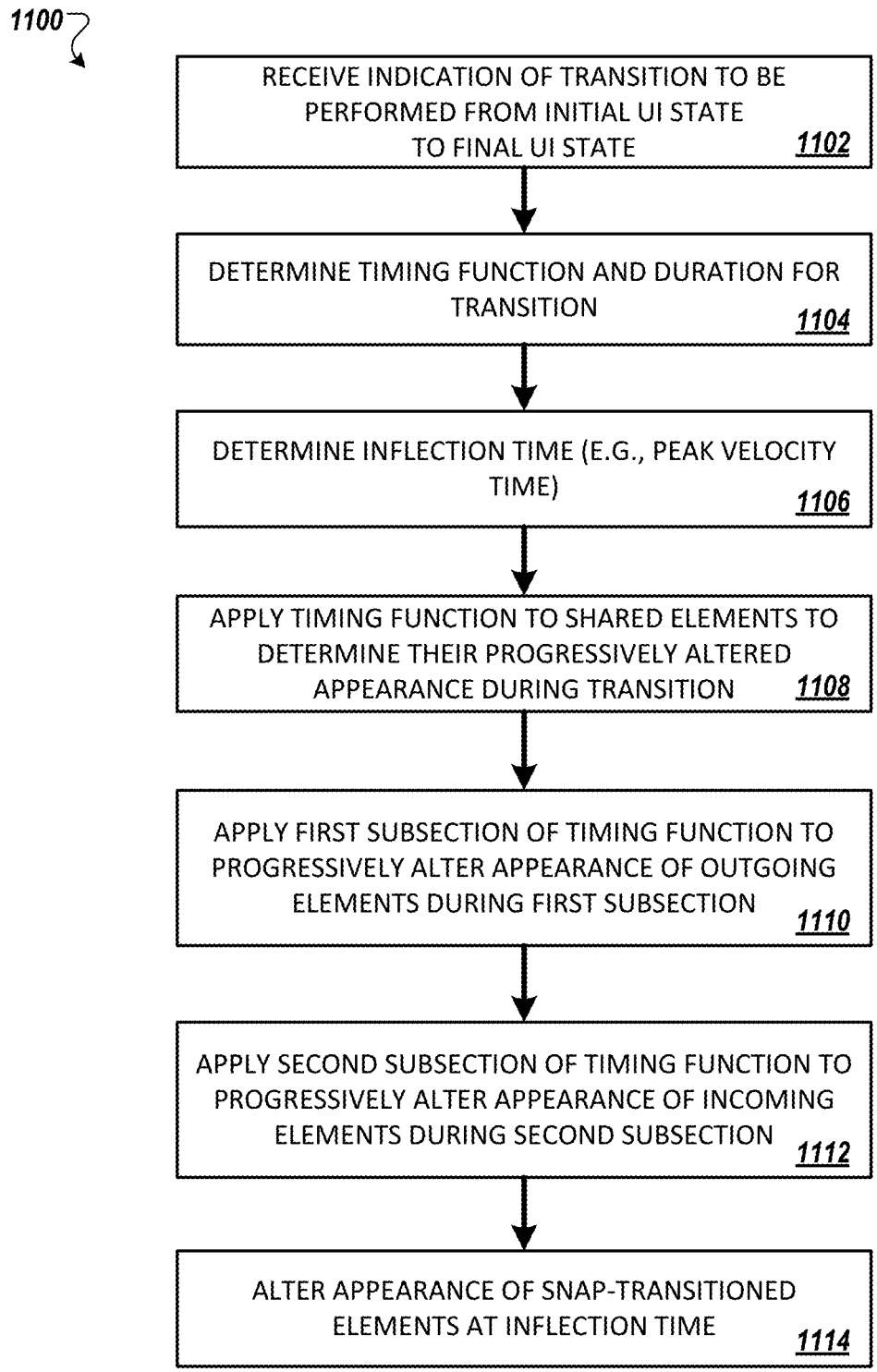
FIG. 11 depicts a flow diagram of an example process for dynamic generation and execution of interface transitions, according to implementations described herein.

FIG. 11 depicts a flow diagram 1100 of an example process for dynamic generation and execution of interface transitions, according to implementations described herein. Operations of the process may be performed by one or more of the software module 106, the transition management module(s) 108, or other software module(s) executing on the user device 104 or elsewhere.

An indication is received (1102) of a transition to be performed in a UI, from an initial UI state to a final UI state. The timing function and the transition duration are determined (1104) for the transition. In some implementations, as described above, the timing function is derived from a master timing function by adjusting the master timing function to span the determined duration of the transition. The inflection time of the timing function may also be determined (1106). In some implementations, the inflection time is calculated based on the timing function (e.g., as a time when the first derivative of the timing function is a maximum). In some implementations, the inflection time is received (e.g., with the timing function and the duration) as an input to the process.

As described above, the timing function may be applied (1108) to drive the transition of the shared elements, to determine their progressively altered appearance during the transition. The first subsection of the timing function may be applied (1110) to drive the transition of the outgoing elements, and the second subsection of the timing function may be applied (1112) to drive the transition of the incoming elements, as described above. The transition may also include altering the appearance (1114) of any snap-transitioned elements at the inflection time, as described above. In some implementations, the progressive alteration of the shared elements may be performed in parallel with the progressive alteration of the outgoing elements, the alteration of the snap-transitioned elements, and the progressive alteration of the incoming elements.

In some implementations, the dynamic generation and execution of the transition described herein may be employed in applications for which the possible transitions are not predetermined at the time when the application is designed, such that the traditional method for individually designing each transition may not be available. For example, a dynamically adaptive application may be designed as a composed collection of components (e.g., pluggable components) that may be dynamically added to, or removed from, the application at run-time (e.g., at application launch and/or during execution). Accordingly, the possible transitions between the executing components of the application may not be knowable until the application is executing, and may be dynamically determined and managed at run-time through the implementations described herein. Using the implementations described herein, an application can be adaptable in handing different configurations that may change on the fly, and the developer of an application can express a UI using a sparse representation without the need to individually design each possible transition. Implementations also facilitate UI transitions in an application that may execute on various types of computing devices with different form factors for available display space. Using the implementations described herein, UI transitions are readily and dynamically adaptable across different display sizes and proportions.

Furthermore, certain combinations of transitions and effects can create a unique visual experience that viewers would associate with a particular brand or product, improving the effectiveness of the UI. More easily recognizable websites or web documents for the website developers help make the developer's content more memorable and effective to visitors.

Implementations provide a memorable and unique way for animation transitions to be generated and applied to different UIs. Visually interesting transitions that can automatically be generated and then applied to particular elements of a UI improve the user experience and allow effective communication of ideas to users. Important elements can be emphasized, character and personality can be imparted to a web document, and a smooth, natural user experience result from use of dynamically generated, visually appealing transition animations.

Although the examples herein describe using a timing function to handle UI transitions that involve shared elements, incoming elements, outgoing elements, and snap-transitioned elements, implementations do not require the presence of each of these types of elements. For example, in some instances a transition may involve incoming elements and/or outgoing elements, but may not involve shared elements. In such instances, the subsections of the timing function may be employed to drive the incoming and outgoing transitions, even if the whole timing function is not being used to determine the transition of any shared elements.

In some implementations, the timing function for a transition is derived from a master timing function that can be similarly applied to multiple transitions within an application, a set of applications, or within a computing environment generally. The transition of each element can be bounded within the duration of the transition, with shared elements transitioning throughout the duration, and with outgoing and incoming elements transitioning during the first and second subsections respectively. In some implementations, the timing of the transitions of various elements can be altered through use of a set of parameters that is specified (e.g., by a developer) for a transition. Such parameter(s) may also be described as a parameter wrapper. The parameter(s) may indicate that the start, end, or rate of progress of certain element transitions is to be varied (e.g., staggered) in timing. Moreover, in some implementations, the parameters may alter the master timing function for different applications to add further detail and/or nuance to some transitions. For example, the parameter(s) may include coefficients of the master timing function, to provide additional degrees of customization for a transition.

Figure 12:
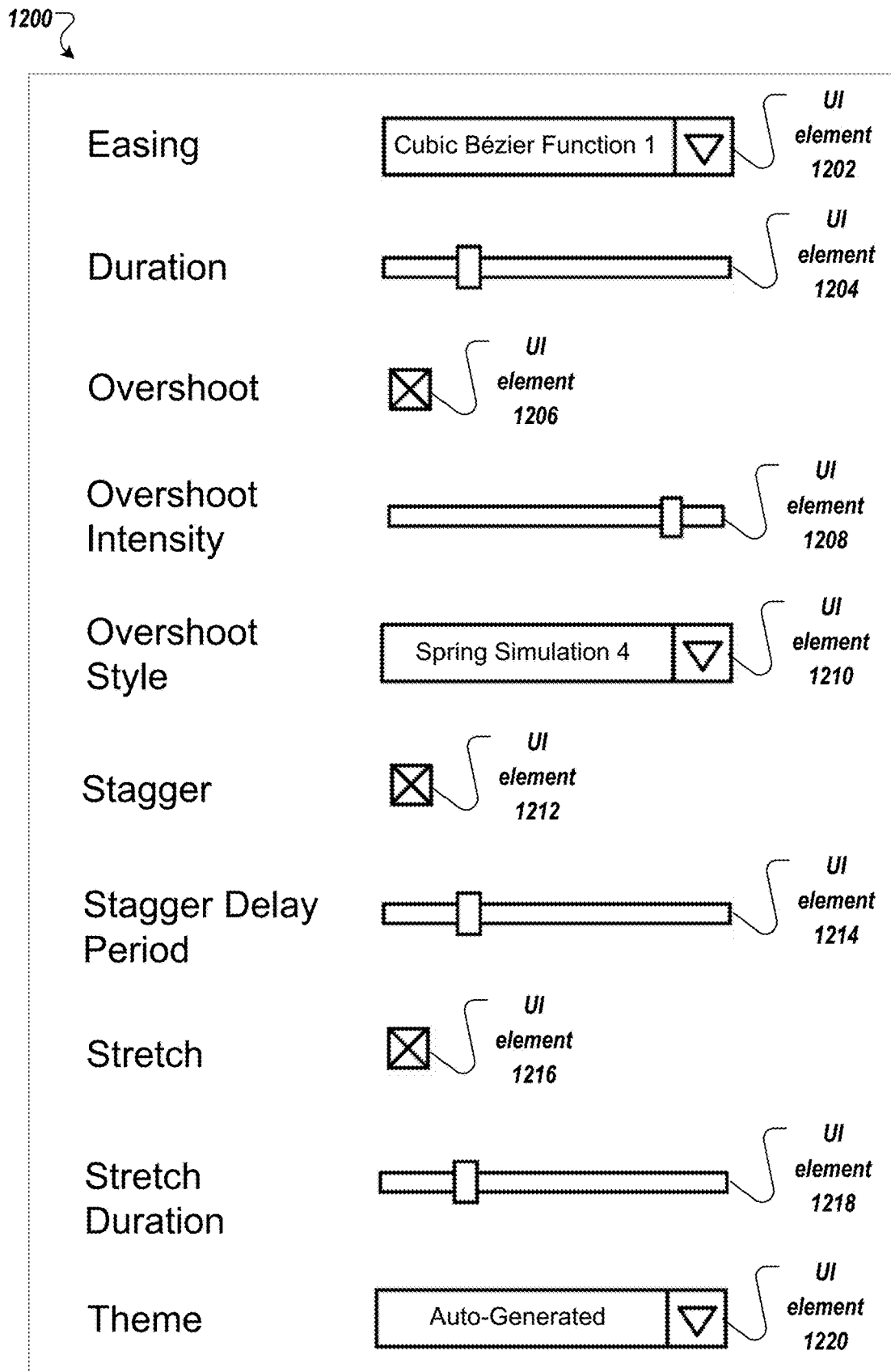
FIG. 12 depicts an example interface for selecting parameter values for particular interface transitions performed based on exemplary timing functions, according to implementations described herein.

FIG. 12 depicts an exemplary menu UI 1200 that allows a user to control aspects of the transition animations as described above with respect to FIGS. 1-11. The user can select a particular cubic Bezier function used for the timing function through UI element 1202. In this particular example, UI element 1202 is a pop-up menu that displays a list of various selectable cubic Bezier functions. The user can define a duration for the timing functions applied to UI transitions using UI element 1204. In this particular example, UI element 1204 is a slider that allows a user to adjust, on a sliding scale, the duration over which the transition should occur. In some implementations, the slider controls a global multiplier for all timing function durations, and does not affect the temporal properties of other transition effects, such as overshoot or oscillation. The user can choose whether to enable overshoot effects during UI transitions using UI element 1206. In this particular example, UI element 1206 is a checkbox that either enables or disables the overshoot effect. The user can define an intensity of overshoot for the UI transition using UI element 1208. In this particular example, UI element 1208 is a slider that allows a user to adjust, on a sliding scale, the intensity (e.g., amplitude, attenuation, etc.) of the overshoot effect. The user can select an overshoot style for the UI transition using UI element 1210. In this particular example, UI element 1210 is a pop-up menu that displays a list of various selectable overshoot functions, such as spring simulations. The user can choose whether to enable stagger effects during UI transitions using UI element 1212. In this particular example, UI element 1212 is a checkbox that either enables or disables the stagger effect. The user can define a delay period of the stagger effect for the UI transition using UI element 1214. In this particular example, UI element 1214 is a slider that allows a user to adjust, on a sliding scale, the temporal offset, or delay, between the timing functions for one or more selected UI elements. The user can choose whether to enable stretch effects during UI transitions using UI element 1216. In this particular example, UI element 1216 is a checkbox that either enables or disables the stretch effect. The user can define a duration of the stretch effect for the UI transition using UI element 1218. In this particular example, UI element 1218 is a slider that allows a user to adjust, on a sliding scale, the duration of the stretch effect during the UI transition (e.g., adjusting the length of the visual trail behind the selected one or more UI elements to which the stretch effect is applied).

In some implementations, the effects can be applied to two or more particular UI elements of the UI, and the user may be presented with a menu UI from which to select the particular UI elements. In the above example menu UI 1200, a user can enable or disable particular transition effects. In some implementations, a user can enable or disable all transition effects. There can be restrictions, however, on the transition effects that a user can enable or disable. For example, a particular transition effect must be enabled for a user to select a value for a particular parameter of the transition effect. Alternatively, if the user selects a value for a particular parameter of a transition effect, the transition effect can be automatically enabled.

Users can select themes or profiles to apply to particular UI transitions using UI element 1220. In this particular example, UI element 1120 is a pop-up menu that displays a list of various themes, or profiles that define a set of parameter values for each of the transition effects, including whether the effect is enabled or disabled. The themes or profiles can be user generated, predetermined, or dynamically generated. For example, one or more of the software module 106, the transition management module(s) 108, or other software module(s) executing on the user device 104 or elsewhere can apply a set of rules to constrain UI transition generation to particular elements and particular transition effects that are visually pleasing. In some implementations, a user can provide input, such as the purpose and preferred look of a UI, and one or more of the software module 106, the transition management module(s) 108, or other software module(s) executing on the user device 104 or elsewhere can select individual transition effects and parameters or generate an entire customized theme.

Each of the above described transition effects can be combined with the other effects, and these effects and parameters of the effects can be controlled with an exemplary UI, such as menu UI 1200.

Other types of UI elements, such as radio buttons, dropdown menus, checkboxes, sliders, switches, buttons, links, and icons, can be used in place of the exemplary UI elements as described. The particular types of UI elements selected to perform each function and as described in the alternative were provided for ease of illustration, and are not meant to be exhaustive.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

The invention claimed is:

1. A method performed by a computing device, the method comprising:
   determining, by the computing device, a transition duration for a transition of a user interface (UI) from a first UI state to a second UI state;
   altering, by the computing device, the appearance of the UI to transition from the first UI state to the second UI state over the transition duration according to a timing function that (i) specifies different rates of change in appearance over the course of the transition and (ii) is derived by adjusting a master timing function to span the transition duration for the transition from the first UI state to the second UI state, the master timing function used to control a plurality of transitions in the UI, wherein the appearance of the UI is altered by:
      determining a time value of an inflection point within the timing function;
      dividing the transition duration into a first portion and a second portion so that (i) the first portion extends from the beginning of the transition duration to the time value of the inflection point, and (ii) the second portion extends from the time value of the inflection point to the end of the transition duration;
      progressively transforming at least one element of a set of graphical elements that is presented in the first UI state during the first portion of the transition duration; and/or
      progressively transforming at least one element of a set of graphical elements that is presented in the second UI state during the second portion of the transition duration.

2. The method of claim 1, further comprising, for each of the plurality of transitions in the UI:
   generating an individual transition duration within the transition duration; and
   wherein the individual transition duration is offset from the beginning of the transition duration by a specified amount of time.

3. The method of claim 1, wherein at least one parameter of an appearance of at least one outgoing element of the set of graphical elements that is presented in the first UI state and at least one incoming element of the set of graphical elements that is presented in the second UI state is altered, during the transition, the at least one parameter comprising one or more of a position, a size, a shape, a Z-level, an orientation, an opacity, a color, or a shading of the respective graphical element.

4. The method of claim 3, wherein the parameter of the appearance of the at least one outgoing element and the at least one incoming element is altered with a varying rate of change specified by the timing function.

5. The method of claim 3, wherein altering the parameter of the appearance of the at least one outgoing element comprises changing the parameter from an initial value to a final value at a velocity rate that varies, over the transition duration, according to the timing function.

6. The method of claim 5, wherein changing the parameter from an the initial value to a final value comprises moving the parameter past the final value.

7. The method of claim 6, wherein the changing the parameter from the initial value to the final value further comprises varying the value of the parameter in an oscillating manner about the final value according to a sinusoidal function having specified amplitude and attenuation.

8. A system comprising:
a computing device comprising at least one processor; and
a memory communicatively coupled to the at least one processor, the memory storing instructions which, when executed by the at least one processor, cause the at least one processor to perform operations comprising:
determining, by the computing device, a transition duration for a transition of a user interface (UI) from a first UI state to a second UI state;
altering, by the computing device, the appearance of the UI to transition from the first UI state to the second UI state over the transition duration according to a timing function that (i) specifies different rates of change in appearance over the course of the transition and (ii) is derived by adjusting a master timing function to span the transition duration for the transition from the first UI state to the second UI state, the master timing function used to control a plurality of transitions in the UI, wherein the appearance of the UI is altered by:
determining a time value of an inflection point within the timing function;
dividing the transition duration into a first portion and a second portion so that (i) the first portion extends from the beginning of the transition duration to the time value of the inflection point, and (ii) the second portion extends from the time value of the inflection point to the end of the transition duration;
progressively transforming at least one element of a set of graphical elements that is presented in the first UI state during the first portion of the transition duration; and/or
progressively transforming at least one element of a set of graphical elements that is presented in the second UI state during the second portion of the transition duration.

9. The system of claim 8, the operations further comprising, for each of the plurality of transitions in the UI:
generating an individual transition duration within the transition duration; and
wherein the individual transition duration is offset from the beginning of the transition duration by a specified amount of time.

10. The system of claim 8, wherein at least one parameter of an appearance of at least one outgoing element of the set of graphical elements that is presented in the first UI state and at least one incoming element of the set of graphical elements that is presented in the second UI state is altered, during the transition, the at least one parameter comprising one or more of a position, a size, a shape, a Z-level, an orientation, an opacity, a color, or a shading of the respective graphical element.

11. The system of claim 10, wherein the parameter of the appearance of the at least one outgoing element and the at least one incoming element is altered with a varying rate of change specified by the timing function.

12. The system of claim 10, wherein altering the parameter of the appearance of the at least one outgoing element comprises changing the parameter from an initial value to a final value at a velocity rate that varies, over the transition duration, according to the timing function.

13. The system of claim 12, wherein changing the parameter from an the initial value to a final value comprises moving the parameter past the final value.

14. The system of claim 13, wherein the changing the parameter from the initial value to the final value further comprises varying the value of the parameter in an oscillating manner about the final value according to a sinusoidal function having specified amplitude and attenuation.

15. A non-transitory computer-readable storage device storing instructions that when executed by one or more processors of a computing device cause the one or more processors to perform operations comprising:
determining, by the computing device, a transition duration for a transition of a user interface (UI) from a first UI state to a second UI state;
altering, by the computing device, the appearance of the UI to transition from the first UI state to the second UI state over the transition duration according to a timing function that (i) specifies different rates of change in appearance over the course of the transition and (ii) is derived by adjusting a master timing function to span the transition duration for the transition from the first UI state to the second UI state, the master timing function used to control a plurality of transitions in the UI, wherein the appearance of the UI is altered by:
determining a time value of an inflection point within the timing function;
dividing the transition duration into a first portion and a second portion so that (i) the first portion extends from the beginning of the transition duration to the time value of the inflection point, and (ii) the second portion extends from the time value of the inflection point to the end of the transition duration;
progressively transforming at least one element of a set of graphical elements that is presented in the first UI state during the first portion of the transition duration; and/or
progressively transforming at least one element of a set of graphical elements that is presented in the second UI state during the second portion of the transition duration.

16. The non-transitory computer-readable storage device of claim 15, the operations further comprising, for each of the plurality of transitions in the UI:
generating an individual transition duration within the transition duration; and
wherein the individual transition duration is offset from the beginning of the transition duration by a specified amount of time.

17. The non-transitory computer-readable storage device of claim 15, wherein at least one parameter of an appearance of at least one outgoing element of the set of graphical elements that is presented in the first UI state and at least one incoming element of the set of graphical elements that is presented in the second UI state is altered, during the transition, the at least one parameter comprising one or more of a position, a size, a shape, a Z-level, an orientation, an opacity, a color, or a shading of the respective graphical element.

18. The non-transitory computer-readable storage device of claim 17, wherein the parameter of the appearance of the at least one outgoing element and the at least one incoming element is altered with a varying rate of change specified by the timing function.

19. The non-transitory computer-readable storage device of claim 17, wherein altering the parameter of the appearance of the at least one outgoing element comprises changing the parameter from an initial value to a final value at a velocity rate that varies, over the transition duration, according to the timing function.

20. The non-transitory computer-readable storage device of claim 19, wherein changing the parameter from an the initial value to a final value comprises moving the parameter past the final value.

\* \* \* \* \*